United States Patent
Mita et al.

(10) Patent No.: US 10,566,657 B2
(45) Date of Patent: Feb. 18, 2020

(54) ELECTROLYTE, BATTERY, BATTERY PACK, ELECTRONIC APPARATUS, ELECTRIC VEHICLE, POWER STORAGE APPARATUS, AND POWER SYSTEM

(71) Applicant: Murata Manufacturing Co., Ltd., Kyoto (JP)

(72) Inventors: Hiroki Mita, Kanagawa (JP); Kazumasa Takeshi, Kanagawa (JP); Tadahiko Kubota, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 145 days.

(21) Appl. No.: 15/537,372

(22) PCT Filed: Jan. 21, 2016

(86) PCT No.: PCT/JP2016/000307
§ 371 (c)(1),
(2) Date: Jun. 16, 2017

(87) PCT Pub. No.: WO2016/143240
PCT Pub. Date: Sep. 15, 2016

(65) Prior Publication Data
US 2018/0006324 A1 Jan. 4, 2018

(30) Foreign Application Priority Data

Mar. 11, 2015 (JP) ................. 2015-047813

(51) Int. Cl.
*H01M 10/0565* (2010.01)
*H01M 10/052* (2010.01)
*H01M 10/0585* (2010.01)

(52) U.S. Cl.
CPC ..... *H01M 10/0565* (2013.01); *H01M 10/052* (2013.01); *H01M 10/0585* (2013.01); *H01M 2220/20* (2013.01); *Y02E 60/122* (2013.01); *Y02T 10/7011* (2013.01)

(58) Field of Classification Search
CPC ........... H01M 10/0565; H01M 10/052; H01M 10/0585; H01M 2220/20; Y02E 60/122; Y02T 10/7011
See application file for complete search history.

(56) References Cited

U.S. PATENT DOCUMENTS

| 6,387,570 B1 | 5/2002 | Nakamura et al. |
| 2003/0124431 A1 | 7/2003 | Hwang et al. |
| 2016/0043429 A1 | 2/2016 | Hatta et al. |

FOREIGN PATENT DOCUMENTS

| CN | 1412236 A | 4/2003 |
| CN | 103570873 A | 2/2014 |
| CN | 105051963 A | 11/2015 |
| EP | 1011165 A1 | 6/2000 |
| JP | 09-289038 A | 11/1997 |
| JP | 11-067274 A | 3/1999 |
| JP | 2001-135353 A | 5/2001 |
| JP | 2003-201319 A | 7/2003 |
| JP | 2014-013659 A | 1/2014 |
| JP | 2014-207217 A | 10/2014 |
| KR | 10-2003-0032258 A | 4/2003 |
| KR | 10-2015-0132128 A | 11/2015 |
| WO | 1999/010946 A1 | 3/1999 |
| WO | 2014/147955 A1 | 9/2014 |
| WO | 2015/058480 A1 | 4/2015 |

OTHER PUBLICATIONS

International Search Report and Written Opinion of PCT Application No. PCT/JP2016/000307, dated Apr. 12, 2016, 02 pages of English Translation and 07 pages of ISRWO.

*Primary Examiner* — Laura Weiner
(74) *Attorney, Agent, or Firm* — Chip Law Group

(57) ABSTRACT

[Solving Means] A battery includes: a positive electrode; a negative electrode; and an electrolyte. The electrolyte contains an electrolyte solution, and a polymer compound holding the electrolyte solution. The polymer compound includes a copolymer having at least predetermined two kinds of repeating units.

4 Claims, 8 Drawing Sheets

ELECTROLYTE, BATTERY, BATTERY PACK, ELECTRONIC APPARATUS, ELECTRIC VEHICLE, POWER STORAGE APPARATUS, AND POWER SYSTEM

CROSS REFERENCE TO RELATED APPLICATIONS

This application is a U.S. National Phase of International Patent Application No. PCT/JP2016/000307 filed on Jan. 21, 2016, which claims priority benefit of Japanese Patent Application No. JP 2015-047813 filed in the Japan Patent Office on Mar. 11, 2015. Each of the above-referenced applications is hereby incorporated herein by reference in its entirety.

TECHNICAL FIELD

The present technology relates to an electrolyte, a battery, a battery pack, an electronic apparatus, an electric vehicle, a power storage apparatus, and a power system.

BACKGROUND ART

In recent years, an electronic apparatus typified by a mobile phone or portable information terminal equipment is widely used, and the size reduction, reduction in weight, and prolonged service life of the electronic apparatus are strongly desired. Along with this, as a power source, a battery, particularly, a small-sized and light secondary battery that is capable of achieving a high energy density has been developed.

This secondary battery is recently considered to be applied not only to the above-mentioned electronic apparatus but also to various applications typified by an electric tool such as an electric drill, an electric vehicle such as an electric automobile, and a power storage system such as a power server for a house. As power sources of these apparatuses, a secondary battery having high output and a high capacity has been developed.

In the secondary battery, a liquid electrolyte (electrolyte solution), a gel electrolyte, or the like, is used. For example, Patent Literature 1 and Patent Literature 2 describe secondary batteries using gel electrolytes containing polyacrylonitrile.

CITATION LIST

Patent Literature

Patent Literature 1: Japanese Patent No. 4193248
Patent Literature 2: Japanese Patent No. 4161431

DISCLOSURE OF INVENTION

Technical Problem

It is desirable to improve high temperature cycle characteristics of batteries.

Therefore, it is an object of the present technology to provide an electrolyte, a battery, a battery pack, an electronic apparatus, an electric vehicle, a power storage apparatus, and a power system that can improve high temperature cycle characteristics.

Solution to Problem

In order to achieve the above-mentioned object, the present technology is an electrolyte including: an electrolyte solution; and a polymer compound holding the electrolyte solution, in which the polymer compound includes a copolymer having at least two kinds of repeating units represented by a general formula (1).

[Chem. 1]

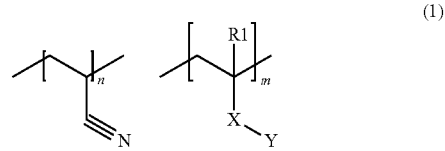

(1)

(In the formula, X represents a divalent hydrocarbon group or a divalent oxygen-containing group. Y represents a monovalent fluorine-containing hydrocarbon group. R1 represents a hydrogen group or a methyl group. n and m each represent a molar ratio (n:m) of the two kinds of repeating units.)

[Chem. 1]

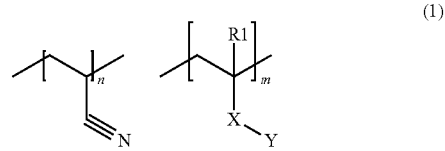

(1)

(In the formula, X represents a divalent hydrocarbon group or a divalent oxygen-containing group. Y represents a monovalent fluorine-containing hydrocarbon group. R1 represents a hydrogen group or a methyl group. n and m each represent a molar ratio (n:m) of the two kinds of repeating units.)

The present technology is a battery including: a positive electrode; a negative electrode; and an electrolyte, in which the electrolyte contains an electrolyte solution, and a polymer compound holding the electrolyte solution, and the polymer compound includes a copolymer having at least two kinds of repeating units represented by a general formula (1).

A battery pack, an electronic apparatus, an electric vehicle, a power storage apparatus, and a power system according to the present technology include the above-mentioned battery.

Advantageous Effects of Invention

In accordance with the electrolyte according to the present technology, because it contains a copolymer having at least two kinds of repeating units represented by the general formula (1), it is possible to improve high temperature cycle characteristics. In accordance with the battery according to the present technology, because the electrolyte contains a copolymer having at least two kinds of repeating units represented by the general formula (1), it is possible to improve high temperature cycle characteristics. Similar effects can be obtained also in the battery pack, the electronic apparatus, the electric vehicle, the power storage apparatus, and the power system according to the present technology.

MODE(S) FOR CARRYING OUT THE INVENTION

Hereinafter, best modes for carrying out the present technology (hereinafter, referred to as "embodiments") will be described. Note that description will be made in the following order.
1. First Embodiment (example of laminated film type battery)
2. Second embodiment (example of battery pack)
3. Third embodiment (example of an electronic apparatus)
4. Fourth embodiment (example of power storage system)
5. Fifth embodiment (example of electric vehicle)
6. Other Embodiments (modified examples)

It should be noted that embodiments and the like described below are favorable specific examples of the present technology, and the content of the present technology is not limited to these embodiments and the like. The effects described herein are merely examples and not necessarily limitative, and do not exclude that there are effects different from the exemplified effects.

1. First Embodiment (1-1) Configuration Example of Laminated Film Type Battery

Figure 1:
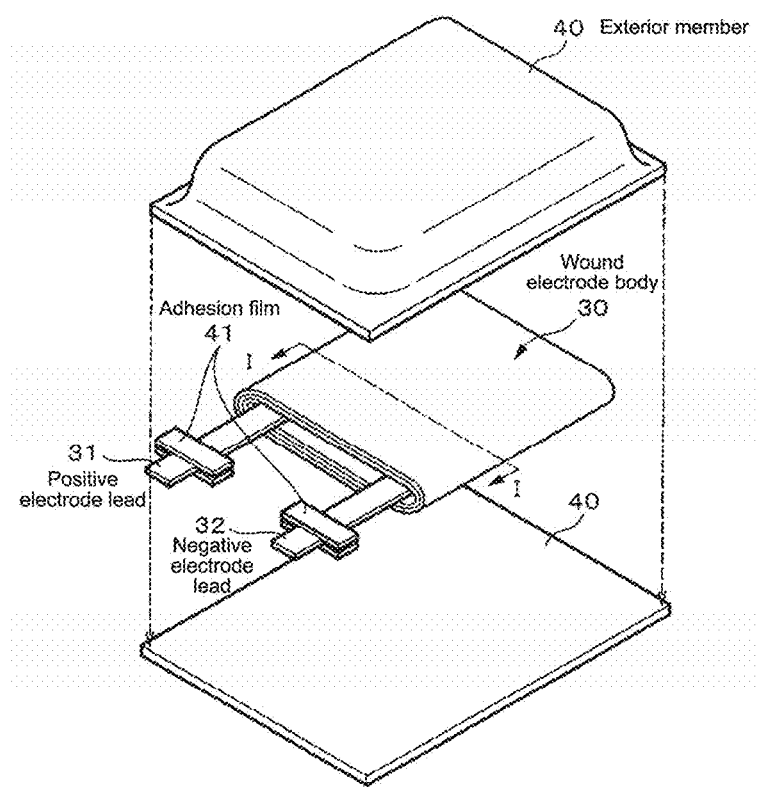
FIG. 1 is an exploded perspective view showing an example of a configuration of a battery according to a first embodiment of the present technology.
Figure 2:
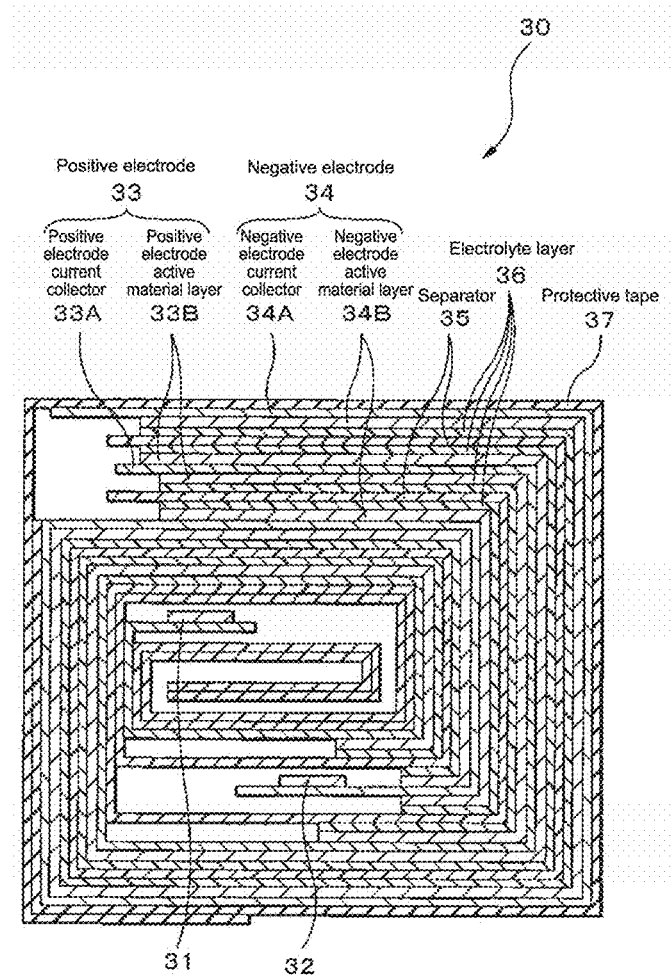
FIG. 2 is a cross-sectional view showing a cross-sectional configuration taken along the line I-I of a wound electrode body shown in FIG. 1.

In a first embodiment of the present technology, a laminated film type non-aqueous electrolyte secondary battery (hereinafter, referred to as "non-aqueous electrolyte battery" or simply "battery") will be described as an example with reference to FIG. 1 and FIG. 2.

A non-aqueous electrolyte battery is one in which a wound electrode body 30 is housed inside an exterior member 40. A positive electrode lead 31 and a negative electrode lead 32 are attached to the wound electrode body 30. For example, the positive electrode lead 31 and the negative electrode lead 32 are led out from the inside of the exterior member 40 to the outside in the same direction.

The positive electrode lead 31 is, for example, a thin plate-shaped conductive member, and is formed of, for example, aluminum (Al). The negative electrode lead 32 is, for example, a thin plate-shaped conductive member, and is formed of copper (Cu), nickel (Ni), stainless steel (SUS), or the like.

(Exterior Member)

The exterior member 40 is a film-like member. The exterior member 40 is, for example, a laminated film in which a fusion layer, a metal layer, and a surface protective layer are laminated in the stated order. The fusion layer is formed of, for example, polyolefin resin such as polyethylene and polypropylene. The metal layer is formed of, for example, aluminum. The surface protective layer is formed of, for example, nylon or polyethylene terephthalate. The exterior member 40 may be a laminated film having another laminated structure, or may be a single polymer film or a single metal film.

Between the exterior member 40 and the positive electrode lead 31, an adhesion film 41 is interposed. Similarly, between the exterior member 40 and the negative electrode lead 32, the adhesion film 41 is interposed. The adhesion film 41 is formed of, for example, a material having high adhesiveness to a metal material. Examples of this material include a resin material such as polyolefin resin.

The wound electrode body 30 is obtained by laminating and winding the positive electrode 33 and the negative electrode 34 via, for example, a separator 35 and an electrolyte layer 36. The outermost peripheral portion of the wound electrode body 30 is covered with a protective tape 37 as necessary. The wound electrode body 30 may be one in which the separator 35 is omitted.

(Positive Electrode)

The positive electrode 33 has a structure in which a positive electrode active material layer 33B is provided on both surfaces of a positive electrode current collector 33A. Note that the positive electrode 33 may have a region where the positive electrode active material layer 33B is provided only on one surface of the positive electrode current collector 33A.

As the positive electrode current collector 33A, for example, a metal foil such as an aluminum foil, a nickel foil, and a stainless steel foil can be used. The positive electrode lead 31 is connected to the positive electrode current collector 33A. The connection position of the positive electrode lead 31 is, for example, one end portion of the positive electrode current collector 33A on which the positive electrode active material layer 33B is not formed.

The positive electrode active material layer 33B contains a positive electrode active material. The positive electrode active material layer 33B may contain other materials such as a conductive agent and a binding agent as necessary.

(Positive Electrode Active Material)

As the positive electrode active material, for example, a material capable of absorbing and releasing lithium can be used. As the positive electrode active material, for example, a lithium-containing compound can be used.

Examples of the lithium-containing compound include a composite oxide containing lithium and a transition metal element (referred to as "lithium transition metal composite oxide"), and a phosphate compound containing lithium and a transition metal element (referred to as "lithium transition metal phosphate compound"). As the lithium-containing compound, those containing at least one of cobalt (Co), nickel, manganese (Mn), and iron (Fe) as a transition metal element are favorable. This is because higher voltage can be achieved.

Examples of the lithium transition metal composite oxide include a lithium transition metal composite oxide having a layered rock salt structure and a lithium transition metal composite oxide having a spinel structure.

Examples of the lithium transition metal composite oxide having a layered rock salt structure include a lithium-containing compound represented by the general formula $Li_xM1O_2$ (in the formula, M1 represents an element containing one or more transition metal elements. The value of x satisfies, for example, the following relationship, $0.05 \leq x \leq 1.10$. The value of x varies depending on the charge/discharge state of the battery. Note that the value of x is not limited thereto.). More specifically, examples of the lithium transition metal composite oxide having a layered rock salt structure include lithium cobalt composite oxide ($Li_xCoO_2$), lithium nickel composite oxide ($Li_xNiO_2$), lithium nickel cobalt composite oxide ($Li_xNi_{1-z}Co_zO_2$ (0<z<1)), lithium nickel cobalt manganese composite oxide ($Li_xNi_{(1-v-w)}Co_vMn_wO_2$ (0<v+w<1, v>0, w>0)), and lithium cobalt aluminum magnesium composite oxide ($Li_xCo_{(1-p-q)}Al_pMg_qO_2$ (0<p+q<1, p>0, q>0)).

Examples of the lithium transition metal composite oxide having a spinel structure include lithium manganese composite oxide ($LiMn_2O_4$) and lithium manganese nickel composite oxide ($Li_xMn_{2-t}Ni_tO_4$ (0<t<2)).

Examples of the lithium transition metal phosphate compound include a lithium transition metal phosphate compound having an olivine type structure.

Examples of the lithium transition metal phosphate compound having an olivine type structure include a lithium-containing compound represented by the general formula $Li_yM2PO_4$ (in the formula, M2 represents an element containing one or more transition metal elements. The value of y satisfies, for example, the following relationship, $0.05 \leq y \leq 1.10$. The value of y varies depending on the charge/discharge state of the battery. Note that the value of y is not limited to this range.). More specifically, examples of the lithium transition metal phosphate compound having an olivine type structure include a lithium iron phosphate compound ($Li_yFePO_4$) and a lithium iron manganese phosphate compound ($Li_yFe_{1-u}Mn_uPO_4$ (0<u<1)).

As the positive electrode active material, covering particles containing particles of the above-mentioned lithium-containing compound and a covering layer provided to at least a part of a surface of particles of a lithium-containing compound may be used. By using such covering particles, it is possible to further improve the battery characteristics.

The covering layer is provided to at least a part of a surface of particles (base material particles) of a lithium-containing compound to be a base material, and has a different composition element or composition ratio from those of the base material particles. Examples of the covering layer include those containing oxide, a transition metal compound, or the like. Specifically, the covering layer includes, for example, oxide containing lithium and at least one of nickel and manganese, a compound containing at least one of elements selected from the group consisting of nickel, cobalt, manganese, iron (Fe), aluminum, magnesium (Mg), and zinc (Zn), oxygen (O), and phosphorus (P), or the like. The covering layer may contain halide such as lithium fluoride or chalcogenide other than oxygen.

The existence of the covering layer can be confirmed by checking the change in the concentration of constituent elements from the surface of the positive electrode active material to the inside thereof. For example, the concentration change can be measured by performing auger electron spectroscopy (AES) or SIMS (Secondary Ion Mass Spectrometry) on the composition of particles of the lithium-containing compound to which the covering layer is provided while grinding them by sputtering or the like. Further, it can be measured by dissolving particles of the lithium-containing compound to which the covering layer is provided in an acid solution or the like and performing inductively coupled plasma (ICP) spectroscopy or the like on the time change in the amount of the elution.

In addition, as the positive electrode active material, for example, oxide, disulfide, chalcogenide containing no lithium (particularly, a layered compound or a spinel type compound), a conductive polymer, or the like can be used. Examples of the oxide include vanadium oxide ($V_2O_5$), titanium dioxide ($TiO_2$), and manganese dioxide ($MnO_2$). Examples of the disulfide include iron disulfide ($FeS_2$), titanium disulfide ($TiS_2$), and molybdenum disulfide ($MoS_2$). Examples of the chalcogenide containing no lithium include niobium diselenide ($NbSe_2$). Examples of the conductive polymer include sulfur, polyaniline, polythiophene, polyacetylene, and polypyrrole.

The positive electrode active material may be other than the positive electrode active material exemplified above. Further, two or more kinds of the positive electrode active materials exemplified above may be mixed in arbitrary combinations.

(Conductive Agent)

As the conductive agent, for example, a carbon material or the like can be used. Examples of the carbon material include graphite, carbon black, and acetylene black. Note that the conductive agent may be a metal material, a conductive polymer, or the like as long as it has conductivity.

(Binding Agent)

As the binding agent, for example, a resin material or the like can be used. Examples of the resin material include polyvinylidene fluoride (PVdF), polytetrafluoroethylene (PTFE), polyacrylonitrile (PAN), styrene butadiene rubber (SBR), and carboxymethyl cellulose (CMC).

(Negative Electrode)

The negative electrode 34 has a structure in which a negative electrode active material layer 34B is provided on both surfaces of a negative electrode current collector 34A. Note that the negative electrode 34 may have a region where the negative electrode active material layer 34B is provided only on one surface of the negative electrode current collector 34A.

As the negative electrode current collector 34A, for example, a metal foil such as a copper foil can be used. The negative electrode lead 32 is connected to the negative electrode current collector 34A. The connection position of the negative electrode lead 32 is, for example, one end portion of the negative electrode current collector 34A on which the negative electrode active material layer 34B is not formed.

The negative electrode active material layer 34B contains a negative electrode active material. The negative electrode active material layer 34B may contain other materials such as a binding agent and a conductive agent as necessary. As the binding agent, a material or the like similar to the binding agent of the positive electrode 33 can be used. As the conductive agent, a material or the like similar to the conductive agent of the positive electrode 33.

(Negative Electrode Active Material)

As the negative electrode active material, for example, a material capable of absorbing and releasing lithium can be used. As the negative electrode active material, for example, a carbon material can be used. The carbon material has very little change in crystal structure generated at the time of charging and discharging, and can achieve high charge/discharge capacity and good cycle characteristics.

The carbon material is, for example, easily graphitizable carbon, non-graphitizable carbon having spacing of (002) plane of not less than 0.37 nm, or graphite having spacing of (002) plane of not more than 0.34 nm. More specifically, the carbon material is pyrolytic carbons, cokes, glassy carbon fibers, organic polymer compound fired body, activated carbon, or carbon blacks. Of these, cokes include pitch coke, needle coke, petroleum coke, and the like. The organic polymer compound fired body is one in which a polymer compound such as phenol resin and furan resin is fired (carbonized) at an appropriate temperature. In addition, the carbon material may be low crystalline carbon or amorphous carbon, which is heat-treated at not more than approximately 1000° C. Note that the shape of the carbon material may be fibrous, spherical, granular, or scaly.

In addition to the carbon material, as the negative electrode active material, for example, a material that is capable of absorbing and releasing lithium and contains at least one of a metal element and a metalloid element as a constituent element (referred to as "metal-based material") can be used. The metal-based material may be, for example, a simple substance, an alloy, a compound, or a mixture of two or more of these. It is favorable to use the metal-based material because a high energy density can be achieved. Note that the term "alloy" encompasses alloys containing two or more kinds of metal elements, and also alloys containing one or more kinds of metal elements and one or more kinds of metalloid elements. Further, these alloys may also contain non-metal elements. Tissues of these alloys include a solid solution, a eutectic crystal (eutectic mixture), or an intermetallic compound, and two or more thereof may coexist.

Examples of the metal elements or the metalloid elements include metal elements and metalloid elements that are capable of forming an alloy with lithium. Specific examples of the metal elements and metalloid elements include magnesium, boron (B), aluminum, titanium (Ti), gallium (Ga), indium (In), silicon (Si), germanium (Ge), tin (Sn), lead (Pb), bismuth (Bi), cadmium (Cd), silver (Ag), zinc, hafnium (Hf), zirconium (Zr), yttrium (Y), palladium (Pd), and platinum (Pt). These materials may be crystalline or amorphous.

As the metal-based material, those containing a metal element or metalloid element of Group 4B in the short form periodic table as constituent elements are favorable. Among them, a material containing at least one of silicon and tin as a constituent element (referred to as "material containing at least one of silicon and tin") is more favorable, and a material containing at least silicon (referred to as "material containing silicon") are particularly favorable. Silicon and tin have a large ability to absorb and release lithium, and can achieve a high energy density.

Examples of the material containing at least one of silicon and tin include a single substance, an alloy, and a compound of silicon, a single substance, an alloy, and a compound of tin, and a material that includes one or more of these forms at least in a portion thereof.

Examples of alloys of silicon include an alloy containing, as its second constituent element other than silicon, at least one kind of element selected from the group consisting of tin, nickel, copper (Cu), iron, cobalt (Co), manganese, zinc, indium, silver, titanium, germanium, bismuth, antimony (Sb), and chromium (Cr). Examples of alloys of tin include an alloy containing, as its second constituent element other than tin, at least one kind of element selected from the group consisting of silicon, nickel, copper, iron, cobalt, manganese, zinc, indium, silver, titanium, germanium, bismuth, antimony, and chromium.

Examples of compounds of tin or compounds of silicon include a compound that contains oxygen or carbon (C). Such compounds may also contain, in addition to tin or silicon, any of the second constituent elements described above.

Among these materials, a SnCoC-containing material that contains cobalt, tin, and carbon as constituent elements, in which the content of carbon is not less than 9.9% by mass and not more than 29.7% by mass and the proportion of cobalt of the sum of tin and cobalt is not less than 30% by mass and not more than 70% by mass, is favorable as the material containing tin. This is because high energy density and excellent cycle characteristics can be achieved in such a composition range.

The SnCoC-containing material may further contain other constituent elements as necessary. As these other constituent elements, for example, silicon, iron, nickel, chromium, indium, niobium (Nb), germanium, titanium, molybdenum (Mo), aluminum, phosphorus, gallium, and bismuth are favorable, and two or more thereof may be contained. This is because capacitance characteristics or cycle characteristics can be further improved.

Note that it is favorable that the SnCoC-containing material has a phase containing tin, cobalt, and carbon, in which the phase has a low crystallized or amorphous structure. Further, in the SnCoC-containing material, it is favorable that at least a part of carbon as the constituent element is bound to a metal element or a metalloid element as the other constituent element. This is because lowering of cycle characteristics may be due to aggregation or crystallization of tin or the like, and carbon is bound to other elements, making it possible to suppress such aggregation or crystallization.

Examples of measurement methods for examining the binding state of elements include X-ray photoelectron spectroscopy (XPS). In this XPS, so far as graphite is concerned, a peak of the is orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, it appears at 284.8 eV. Meanwhile, when a charge density of the carbon element is high, for example, when carbon is bound to a metal element or a metalloid element, the peak of C1s appears in a lower region than 284.5 eV. That is, when a peak of a combined wave of C1s obtained on the SnCoC-containing material appears in a lower region than 284.5 eV, at least a part of carbon contained in the SnCoC-containing material is bound to a metal element or a metalloid element as other constituent element.

Note that in the XPS measurement, for example, the peak of C1s is used for correcting the energy axis of a spectrum. In most cases, because there is some surface-contaminated carbon present in the surface, the peak of C1s of the surface-contaminated carbon can be fixed at 284.8 eV, and this peak can be used as an energy reference. In the XPS measurement, because a waveform of the peak of C1s can be obtained as a form that includes both the peak of the surface-contaminated carbon and the peak of carbon from the SnCoC-containing material, for example, through an analysis using commercial software programs, the peak of the surface-contaminated carbon and the peak of the carbon from the SnCoC-containing material can be separated from each other. In the analysis of the waveform, the position of a main peak existing closer to the lowest binding energy is used as an energy reference (284.8 eV).

In addition, as the negative electrode active material, metal oxides and polymer compounds, each of which is capable of absorbing and releasing lithium, can be used. Examples of the metal oxides include, lithium titanium oxide containing lithium and titanium such as lithium titanate ($Li_4Ti_5O_{12}$), iron oxide, ruthenium oxide, and molybdenum oxide. Examples of the polymer compounds include polyacetylene, polyaniline, and polypyrrole.

Note that metal containing lithium may be used as the negative electrode active material. Examples of the metal containing lithium include lithium metal, and an alloy containing lithium. In this case, a negative electrode active material layer 22B may be formed of metal containing lithium.

The negative electrode active material may be other than the above. Further, two or more kinds of the negative electrode active materials exemplified above may be mixed in arbitrary combinations.

The negative electrode active material layer 22B may be, for example, formed by any of a vapor phase method, a liquid phase method, a spraying method, a applying method, a baking method, and a combined method of two or more kinds of these methods.

Note that examples of the vapor phase method include a physical deposition method and a chemical deposition method, specifically, a vacuum vapor deposition method, a sputtering method, an ion plating method, a laser abrasion method, a thermal chemical vapor deposition (CVD) method, and a plasma chemical vapor deposition method. As the liquid phase method, known techniques such as electrolytic plating and electroless plating can be used. The applying method is, for example, a method in which a particulate negative electrode active material is mixed with a binding agent or the like and then dispersed in a solvent for applying. The baking method is, for example, a method of performing heat treatment at a temperature higher than the melting point of the binding agent or the like after applying by the applying method. As the baking method, known techniques can be also utilized, and examples thereof include an atmospheric baking method, a reaction baking method and a hot press baking method.

(Separator)

The separator 23 isolates the positive electrode 33 and the negative electrode 34, and allows lithium ions to pass while preventing a short circuit of current caused by contact between the both electrodes.

The separator 35 is, for example, a porous film containing resin. This porous film containing resin is obtained by, for example, molding a resin material by a stretch opening method, a phase separation method, or the like. Note that the method of producing the porous film containing resin is not limited thereto.

As the resin material forming the separator 35, for example, polyolefin resin such as polypropylene and polyethylene, acrylic resin, styrene resin, polyester resin, nylon resin, or the like can be used.

The separator 35 may have a structure in which two or more porous films containing resin are laminated. The porous film containing resin may be a mixture of two or more kinds of resin materials (one formed by melt-kneading two or more kinds of resin materials). A porous film containing polyolefin resin is favorable because it has excellent separability between the positive electrode 53 and the negative electrode 54 and occurrence of internal short circuit can be further reduced.

The separator 35 may be a non-woven fabric. The non-woven fabric is a structure produced by joining, entangling, or joining and entangling fibers, without weaving or knitting the fibers. Most materials that can be processed into fibers can be used as the raw material of the nonwoven fabric, and by adjusting the shape such as a fiber length and a thickness, it is possible to cause the materials to have the function depending on the purpose and use.

Examples of the non-woven fabric include a permeable film (polyethylene terephthalate non-woven fabric) using polyethylene terephthalate (PET) fiber. Note that the air permeable film is a film having air permeability. Other examples of the non-woven fabric include those using aramid fiber, glass fiber, cellulose fiber, polyolefin fiber, nylon fiber, or the like. The non-woven fabric may be one using two or more kinds of fibers.

The separator 35 may contain particles such as inorganic particles and organic particles. Examples of such a separator 35 include a substrate and a substrate having a surface layer formed on at least one of both main surfaces of the substrate. The substrate is the above-mentioned porous film containing resin, a non-woven fabric, or the like. For example, the surface layer includes a porous film containing a resin material and particles. For example, the resin material may have a three-dimensional network structure in which fibrils are formed and the fibrils are continuously connected to each other.

(Particles)

As the particles, at least one of inorganic particles and organic particles can be used. Specifically, examples of the inorganic particles include metal oxides, metal oxide hydrates, metal hydroxides, metal nitrides, metal carbides, metal sulfides, and minerals, which are electrically insulating inorganic particles.

Examples of metal oxides or metal oxide hydrates include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), and zinc oxide (ZnO).

Examples of metal nitrides include silicon nitride ($Si_3Ni_4$), aluminum nitride (AlN), boron nitride (BN), and titanium nitride (TiN). Examples of metal carbides include silicon carbide (SiC) and boron carbide ($B_4C$). Examples of metal sulfides include barium sulfate ($BaSO_4$).

Examples of metal hydroxides include aluminum hydroxide ($Al(OH)_3$). Examples of the mineral include a porous aluminosilicate such as zeolite ($M_{2/n}O.Al_2O_3.xSiO_2.yH_2O$, M is a metal element, $x \geq 2$, $y \geq 0$), a layer silicate such as talc ($Mg_3Si_4O_{10}(OH)_2$), barium titanate ($BaTiO_3$), and strontium titanate ($SrTiO_3$).

Examples of other inorganic particles include particles of a lithium compound, and particles of a carbon material. Examples of the lithium compound include $Li_2O_4$, $Li_3PO_4$, and LiF. Examples of the carbon material include graphite, carbon nanotube, and diamond.

These inorganic particles may be used singly or in mixtures of two or more thereof. The shape of the inorganic particles is not limited in particular, and may be any of a spherical shape, a fiber shape, an acicular shape, a scale-like shape, a plate shaped, and the like.

Examples of materials constituting the organic particles include a fluorine-containing resin such as polyvinylidene fluoride and polytetrafluoroethylene, a fluorine-containing rubber such as vinylidene fluoride-tetrafluoroethylene copolymer and ethylene-tetrafluoroethylene copolymer, styrene-butadiene copolymer and hydrides thereof, acrylonitrile-butadiene copolymer and hydrides thereof, acrylonitrile-butadiene-styrene copolymer and hydrides thereof, methacrylic ester-acrylic ester copolymer, styrene-acrylic ester copolymer, acrylonitrile-acrylic ester copolymer, rubbers such as ethylene propylene rubber, polyvinyl alcohol, polyvinyl acetate, and the like, cellulose derivatives such as ethyl cellulose, methyl cellulose, hydroxyethyl cellulose and carboxymethyl cellulose, polyphenylene ether, polysulfone, polyether sulfone, polyphenylene sulfide, polyetherimide, polyimide, polyamide such as wholly aromatic polyamide (aramid), polyamideimide, polyacrylonitrile, polyvinyl alcohol, polyether, an acrylate resin, polyester, and other resins having high heat resistance where at least one temperature of a melting point and a glass-transition temperature is equal to or higher than 180° C.

These materials may be used alone or two or more of them may be mixed and used. The shape of the organic particles is not limited in particular, and may be any of a spherical shape, a fiber shape, an acicular shape, a scale-like shape, a plate shape, and the like.

(Electrolyte Layer)

The electrolyte layer 36 is obtained by holding an electrolyte solution with a polymer compound, and may contain other materials such as additives as necessary. This electrolyte layer 36 is, for example, a so-called gel electrolyte.

The electrolyte layer 36 is one formed between the positive electrode 33 and the negative electrode 34. For example, the electrolyte layer 36 is formed between the positive electrode 33 and the negative electrode 34. Specifically, for example, the electrolyte layer 36 is formed between the positive electrode 33 and the separator 35 and/or between the negative electrode 34 and the separator 35. Note that in the example shown in FIG. 2, the electrolyte layer 36 is formed between the positive electrode 33 and the separator 35 and between the negative electrode 34 and the separator 35. In the configuration omitting the separator 35, the electrolyte layer 36 is formed between the positive electrode 33 and the negative electrode 34.

(Electrolyte Solution)

The electrolyte solution is, for example, a non-aqueous electrolyte solution containing an electrolyte salt and a non-aqueous solvent dissolving the electrolyte salt. The non-aqueous electrolyte solution may contain additives and the like for improving battery characteristics as necessary.

(Electrolyte Salt)

An electrolyte salt contains one or more light metal compounds such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among them, at least one of the group consisting of lithium hexafluorophosphate, lithium tetrafluoroborate, lithium perchlorate, and lithium hexafluoroarsenate is favorable, and lithium hexafluorophosphate is more favorable.

(Non-Aqueous Solvent)

As the non-aqueous solvent, for example, cyclic carbonic acid ester, chain carbonic acid ester, lactone, chain carboxylic acid ester, nitrile, and the like can be used. By using these compounds, more excellent battery capacity, more excellent cycle characteristics, more excellent storage characteristics, and the like can be achieved.

Examples of the cyclic carbonic acid ester include ethylene carbonate, propylene carbonate, and butylene carbonate. Examples of the chain carbonic acid ester include dimethyl carbonate, diethyl carbonate, ethyl methyl carbonate, and methyl propyl carbonate. Examples of the lactone include γ-butyrolactone and γ-valerolactone. Examples of the carboxylic acid ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

In addition, as the non-aqueous solvent, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methyl pyrrolidinone, N-methyloxazolidinone, N,N'-dimethylimidazolidinone, nitromethane, nitroethane, sulfolane, trimethyl phosphate, dimethylsulfoxide, and the like can be used. This is because advantages similar to those described above can be achieved.

Among these, it is favorable to use one or more of ethylene carbonate, propylene carbonate, dimethyl carbonate, diethyl carbonate, and ethyl methyl carbonate. This is because more excellent battery capacity, more excellent cycle characteristics, more excellent storage characteristics, and the like can be achieved.

When two or more of them are used, a combination of a high viscosity (high dielectric constant) solvent (e.g., relative dielectric constant $\varepsilon \geq 30$) and a low viscosity solvent (e.g., viscosity$\leq 1$ mPa/s) is more favorable. This is because the dissociation property of the electrolyte salt and the mobility of ions are further improved. Examples of the high viscosity solvent include ethylene carbonate and propylene carbonate. Examples of the low viscosity solvents include dimethyl carbonate, ethyl methyl carbonate, and diethyl carbonate.

The non-aqueous solvent may contain one or more of unsaturated cyclic carbonic acid ester, halogenated carbonic acid ester, sultone (cyclic sulfonic acid ester), and acid anhydride. This is because the chemical stability of the electrolyte solution is further improved.

The unsaturated cyclic ester carbonate represents a cyclic ester carbonate having one or more unsaturated carbon bonds (at least one of a carbon-carbon double bond and a carbon-carbon triple bond). Examples of the unsaturated cyclic ester carbonate include vinylene carbonate, vinyl ethylene carbonate, and methylene ethylene carbonate.

The halogenated carbonate ester represents cyclic or chain carbonic acid ester containing one or more halogens as constituent elements. Examples of the cyclic halogenated carbonic acid ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. Examples of the sultone include propane sultone and propene sultone. Examples of the anhydride include succinic anhydride, ethanedisulfonic anhydride, and sulfobenzoic anhydride. However, the non-aqueous solvent may contain a compound other than the compounds described above.

(Copolymer Compound)

As the polymer compound, a copolymer having at least two kinds of repeating units represented by the general formula (1) (referred to as "copolymer 1") can be used. Note that the term "copolymer having at least two kinds of repeating units" includes not only copolymers having only two kinds of repeating units but also those having other kinds of repeating units other than the two kinds of repeating units included.

[Chem. 2]

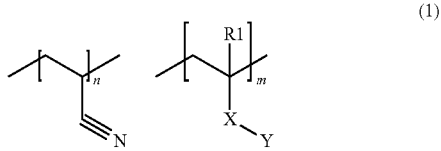

(1)

(In the formula, X represents a divalent hydrocarbon group or a divalent oxygen-containing group. Y represents a monovalent fluorine-containing hydrocarbon group. R1 represents a hydrogen group or a methyl group. n and m each represent a molar ratio (n:m) of the two kinds of repeating units.)

The "hydrocarbon group" is a generic term for groups formed of C and H, and may be linear, branched having one or more side chains, or cyclic. Typically, the "divalent hydrocarbon group" is, for example, a "divalent saturated hydrocarbon group" or the like. The "saturated hydrocarbon group" is an aliphatic hydrocarbon group having no carbon-carbon multiple bond. Note that the "aliphatic hydrocarbon group" also includes an alicyclic hydrocarbon group having a ring. The "divalent saturated hydrocarbon group" is, for example, an alkylene group (—$C_pH_{2p}$—: p represents an integer of 1 or more) such as a methylene group (—$CH_2$—).

The "oxygen-containing group" represents a group containing at least O, and is for example, a group formed C and O, a group formed of C, O and H, or the like. The "divalent oxygen-containing group" is, for example, an alkyleneoxy group such as an ester group (—CO—O—) and an oxymethylene group (—$CH_2$—O—).

The "fluorine-containing hydrocarbon group" is one in which at least a part of hydrogen groups (—H) of the above-mentioned hydrocarbon group is substituted with a fluorine group. Examples of the "monovalent fluorine-containing hydrocarbon group" include a perfluoroalkyl group such as a pentafluoroethyl group (—$C_2F_5$).

From the viewpoint of achieving more excellent effects, in the copolymer 1, it is favorable to satisfy the following relationships, $45 \leq n \leq 95$ and $5 \leq m \leq 55$, as an example of n and m.

From the viewpoint of achieving more excellent effects, as the copolymer 1, one having a repeating unit represented by "—($CH_2$—CHZ)o-" in addition to the two kinds of repeating units represented by the general formula (1) is favorable. Examples of such a copolymer include a copolymer having at least three kinds of repeating units represented by the general formula (1a) (referred to as "copolymer 1a") can be mentioned.

The "copolymer having at least three kinds of repeating units" includes not only copolymers having only three kinds of repeating units but also those having other kinds of repeating units other than three kinds of repeating units.

[Chem. 3]

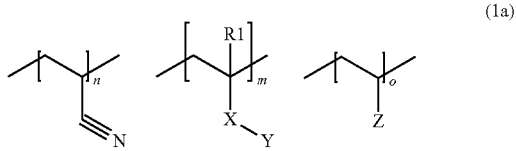

(1a)

(In the formula, X represents a divalent hydrocarbon group or a divalent oxygen-containing group. Y represents a monovalent fluorine-containing hydrocarbon group. R1 represents a hydrogen group or a methyl group. Z represents a monovalent organic group containing an aromatic ring. n, m, and o each represent a molar ratio (n:m:o) of the three kinds of repeating units.)

The "organic group" represents a group containing at least carbon and may contain one or more elements other than carbon. The "monovalent organic group containing an aromatic ring" is, for example, a "monovalent hydrocarbon group containing an aromatic ring", and specifically, a phenyl group (—$C_6H_5$) or the like.

From the viewpoint of achieving more excellent effects, in the copolymer 1a, it is favorable to satisfy the following relationship, $45 \leq n \leq 95$, $5 \leq m \leq 55$, and $0 < o \leq 50$, as an example of n, m, and o.

As the polymer compound, the copolymer 1 may be used alone, or a mixture of the copolymer 1 and a different polymer compound may be used. As the different polymer compound, for example, a homopolymer or a copolymer having a repeating unit derived from vinylidene fluoride (referred to as "polymer containing vinylidene fluoride") is favorable.

Examples of the polymer containing vinylidene fluoride include polyvinylidene fluoride (vinylidene fluoride homopolymer), a vinylidene fluoride-hexafluoropyrene copolymer, a vinylidene fluoride-tetrafluoroethylene copolymer, and a vinylidene fluoride-hexafluoropropylene-chlorotrifluoroethylene copolymer. These may be used alone or a plurality of kinds of them may be mixed and used. Among them, polyvinylidene fluoride or a vinylidene fluoride-hexafluoropyrene copolymer is favorable, and a vinylidene fluoride-hexafluoropyrene copolymer is more favorable.

As a typical example, the molar percentage of the repeating unit derived from hexafluoropropylene contained in the vinylidene fluoride-hexafluoropropylene copolymer is not less than 4.5 mol % and not more than 20 mol %.

(Mixing Ratio of Copolymer 1 and Other Polymer Compound)

As a typical example, the mixing ratio of the copolymer 1 and the other polymer compound is in the range of 10:90 to 90:10 by mass ratio (copolymer 1:other polymer compound), and favorably, in the range of 20:80 to 50:50 from the viewpoint of achieving better effects.

(Electrolyte Layer Containing Particles)

The electrolyte layer 36 may contain particles. As the particles, particles similar to those described above can be used.

(Effects)

In the present technology, it is possible to improve high temperature cycle characteristics by containing the copolymer 1 as a polymer compound contained in the electrolyte. In particular, it is possible to improve the high temperature cycle characteristics (referred to as "high charge voltage high temperature cycle characteristics") in the case of repeating charge and discharge under high temperature environment at high charging voltage (e.g., not less than 4.25 V). Even when the polymer compound contained in the electrolyte contains a vinylidene fluoride polymer together with the copolymer 1, it is possible to improve the high charge voltage high temperature cycle characteristics, and the dispersibility, strength and applicability of the electrolyte are also good.

Meanwhile, in an electrolyte (PVdF gel) using polyvinylidene fluoride alone as a polymer compound, the high charge voltage high temperature cycle characteristics tend to deteriorate. On the contrary, in an electrolyte using polyacrylonitrile alone as a polymer compound, it is possible to improve the high charge voltage high temperature cycle characteristics. However, because the viscosity of this electrolyte is too high, the applicability tends to be poor.

Further, in the electrolyte using polyvinylidene fluoride and polyacrylonitrile, the dispersibility is deteriorated and the strength is reduced. The above-mentioned Patent Literature 1 (Japanese Patent No. 4193248) describes that a gel electrolyte using polyvinylidene fluoride and polyacrylonitrile improves cycle characteristics and short circuit rate. However, the effect on the high charge voltage high temperature cycle characteristics is not described, and the gel strength is not mentioned.

(Example of Confirmation of Components of Electrolyte)

The inclusion of the copolymer 1 in the electrolyte contained in the battery can be confirmed, for example, as follows. First, the battery is disassembled, and the gel (electrolyte) adhering on the electrode and separator is peeled off with a spatula or the like. Next, only the gel is left by using a solvent in which only the electrolyte solution is soluble. The state of the gel is checked using NMR (Nuclear Magnetic Resonance) spectroscopy or GPC (Gel Permeation Chromatography). Note that in the case of a blended gel, two peaks of GPC can be confirmed. In the case of a gel formed of two kinds of polymers, a homogeneous polymer is left by using a poor solvent of one of the gels. Elemental analysis is performed using NMR, IR (Infrared spectroscopy), GPC, and the like to identify polymer species.

(Battery Voltage)

The battery may be designed so that the open circuit voltage (i.e., the battery voltage) at the time of complete charge falls within a range of, for example, not less than 2.80 V and not more than 6.00 V, favorably, not less than 4.25 V and not more than 6.00 V, and more favorably, not less than 4.35 V and not more than 4.60 V. In the case where the open circuit voltage at the time of complete charge is set to not less than 4.25 V in a battery using a lithium transition metal composite oxide having a layered rock salt structure as a positive electrode active material, because the amount of lithium released per unit mass increases even with the same positive electrode active material as compared with a battery with the open circuit voltage of 4.20 V, the amounts of the positive electrode active material and the negative electrode active material are adjusted depending thereon. With this, a high energy density can be achieved. Because the electrolyte according to the present technology is capable of improving the high charge voltage high temperature cycle characteristics, it is particularly effective for a battery designed to have such a high battery voltage.

(1-2) Method of Producing Non-Aqueous Electrolyte Battery

The non-aqueous electrolyte battery is produced by, for example, the following three kinds of procedures.

In a first production method, first, the positive electrode 33 and the negative electrode 34 are prepared.

(Method of Producing Positive Electrode)

A positive electrode mixture is prepared by mixing a positive electrode active material, a conductive agent, and a binding agent, and this positive electrode mixture is dispersed in a solvent such as N-methyl-2-pyrrolidone to prepare a paste-like positive electrode mixture slurry. Next, this positive electrode mixture slurry is applied to the positive electrode current collector 33A, and the solvent is dried and compression-molded by a roll press machine or the like to form the positive electrode active material layer 33B, thereby preparing the positive electrode 33.

(Method of Producing Negative Electrode)

A negative electrode mixture is prepared by mixing a negative electrode active material and a binding agent, and this negative electrode mixture is dispersed in a solvent such as N-methyl-2-pyrrolidone to prepare a paste-like negative electrode mixture slurry. Next, this negative electrode mixture slurry is applied to the negative electrode current collector 34A, and the solvent is dried and compression-molded by a roll press machine or the like to form the negative electrode active material layer 34B, thereby preparing the negative electrode 34.

(Preparation of Non-Aqueous Electrolyte Solution)

The non-aqueous electrolyte solution is prepared by dissolving an electrolyte salt in a non-aqueous solvent.

Next, a precursor solution containing a non-aqueous electrolyte solution, a polymer compound, and a solvent is prepared and applied to the positive electrode 33 and the negative electrode 34, and then, the solvent is volatilized to form the gel electrolyte layer 36. Next, the positive electrode lead 31 is attached to the positive electrode current collector 33A by welding or the like, and the negative electrode lead 32 is attached to the negative electrode current collector 34A by welding or the like. Next, the positive electrode 33 and the negative electrode 34 on which the electrolyte layer 36 is formed are laminated and wound via the separator 35, and then, the protective tape 37 is adhered to the outermost peripheral portion of thereof, thereby producing the wound electrode body 30. Finally, after the wound electrode body 30 is sandwiched between the two film-like exterior member 40, outer edge portions of the exterior members 40 are adhered to each other by thermal fusion or the like to seal the wound electrode body 30. At this time, the adhesion film 41 is inserted between the positive electrode lead 31 and the negative electrode lead 32 and the exterior member 40. As a result, the non-aqueous electrolyte battery shown in FIG. 1 and FIG. 2 is completed.

In a second production method, first, the positive electrode lead 31 is attached to the positive electrode 33, and the negative electrode lead 32 is attached to the negative electrode 34. Next, the positive electrode 33 and the negative electrode 34 are laminated and wound via the separator 35, and then the protective tape 37 is adhered to the outermost peripheral portion thereof, thereby producing a wound body that is a precursor of the wound electrode body 30. Next, after the wound body is sandwiched between the two film-shaped exterior members 40, the remaining outer peripheral edge portion excluding the outer peripheral edge portion on one side is adhered by thermal fusion or the like, and the wound body is housed inside the bag-like exterior member 40. Next, a composition for an electrolyte containing a non-aqueous electrolyte solution, a monomer as a raw material of a polymer compound, a polymerization initiator, and, if necessary, another material such as a polymerization inhibitor, is prepared and injected into the bag-like exterior member 40, and then, the opening of the exterior member 40 is hermetically sealed by thermal fusion or the like. Finally, the monomer is thermally polymerized into a polymer compound to form the gel electrolyte layer 36. As a result, the non-aqueous electrolyte battery is completed.

In a third production method, first, a wound body is formed and housed inside a bag-like exterior member 40, similarly to the above-mentioned second production method except that the separator 35 having both surfaces on which a polymer compound is applied is used.

Next, a non-aqueous electrolyte solution is prepared and injected into the exterior member 40, and then the opening of the exterior member 40 is hermetically sealed by thermal fusion or the like. Finally, the exterior member 40 is heated while adding additional weight thereto, and the separator 35 is brought into close contact with the positive electrode 33 and the negative electrode 34 via the polymer compound. As a result, the non-aqueous polymer compound is impregnated with the electrolyte solution, and the polymer compound is gelled to form the electrolyte layer 36, thereby completing the non-aqueous electrolyte battery. In the third production method, the monomer, which is the raw material of the polymer compound, the solvent, and the like, are hardly left in the electrolyte layer 36, and the process of forming the polymer compound is favorably controlled, as compared with the second production method. Therefore, sufficient adhesion can be achieved between the positive electrode 33, the negative electrode 34, and the separator 35, and the electrolyte layer 36.

(1-3) Another Example of Laminated Film Type Battery

Figure 3A:
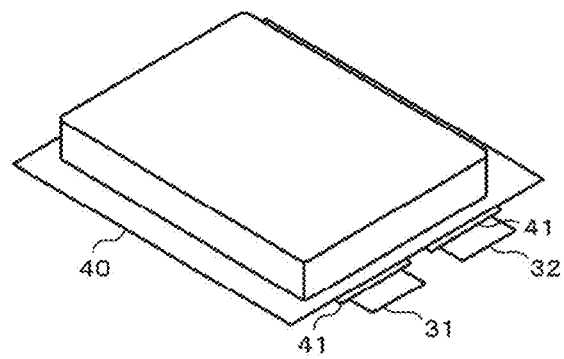
FIGS. 3A, 3B and 3C are each an exploded perspective view showing another example of the configuration of the battery according to the first embodiment of the present technology.
Figure 3B:
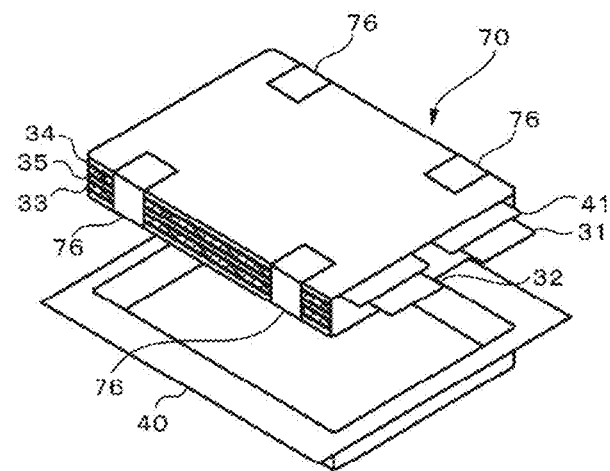
Figure 3C:
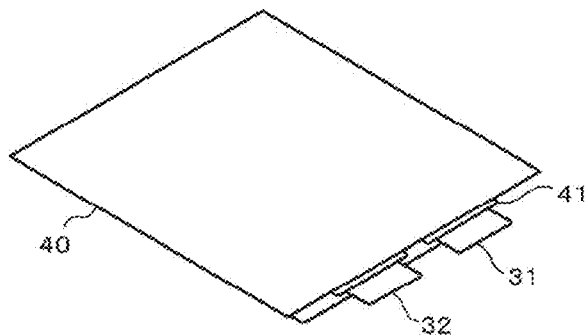

Although the laminated film type battery using the wound electrode body 30 has been described in the above example, a laminated electrode body 70 may be used instead of the wound electrode body 30, as shown in FIGS. 3A, 3B and 3C. The laminated electrode body 70 is obtained by laminating a plurality of rectangular positive electrodes 33 and negative electrodes 34 via the separator 35, and fixing them by a fixing member 76. From the laminated electrode body 70, the positive electrode lead 31 and the negative electrode lead 32 are led out in the same direction. The positive electrode lead 31 is connected to the positive electrode 33, and the negative electrode lead 32 is connected to the negative electrode 34. Between the positive electrode lead 31 and the negative electrode lead 32 and the exterior member 40, the adhesion film 41 is provided.

2. Second Embodiment

Figure 4:
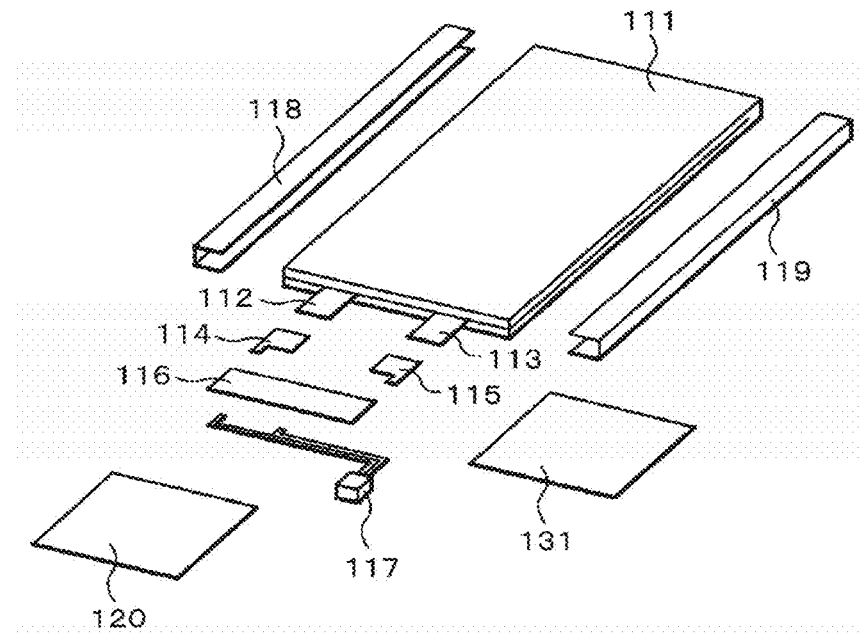
FIG. 4 is a perspective view showing a configuration example of a battery pack according to a second embodiment of the present technology.

In a second embodiment of the present technology, an example of a configuration of a battery pack will be described with reference to FIG. 4 and FIG. 5.

This battery pack is a simplified type battery pack (so-called soft pack) using one secondary battery (single battery), and is built in, for example, an electronic apparatus typified by a smartphone. The battery pack includes a battery cell 111 and a circuit board 116 connected to the battery cell 111. The battery cell 111 is, for example, a laminated film type secondary battery according to the first embodiment.

A pair of adhesive tapes 118 and 119 is attached to both side surfaces of the battery cell 111. On the circuit board 116, a protection circuit (PCM: Protection Circuit Module) is formed. The circuit board 116 is connected to a positive electrode lead 112 and a negative electrode lead 113 of the battery cell 111 via a pair of tabs 114 and 115, and also to a lead 117 with a connector for external connection. Note that in the state where the circuit board 116 is connected to the battery cell 111, the circuit board 116 is protected from above and below by a label 120 and an insulating sheet 131. By attaching this label 120, the circuit board 116, the insulating sheet 131, and the like are fixed.

Figure 5:
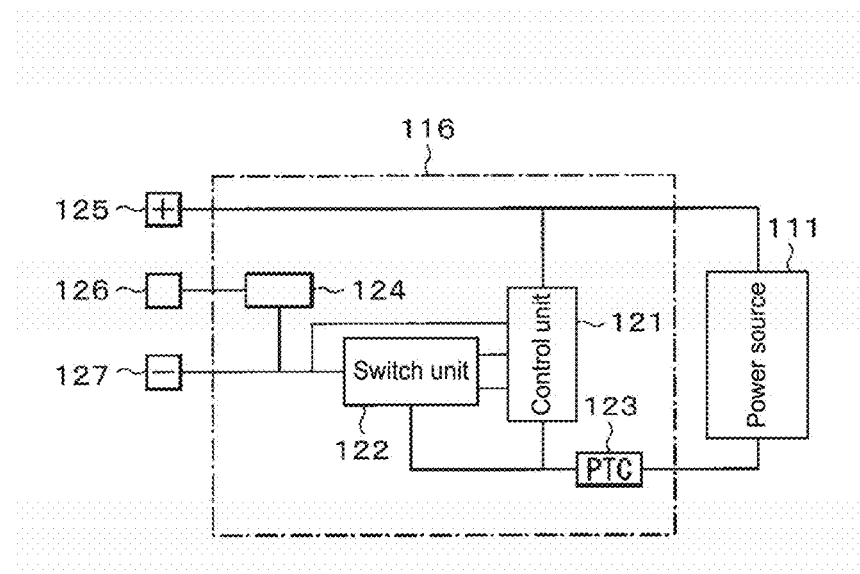
FIG. 5 is a block diagram showing a configuration example of the battery pack shown in FIG. 4.

Further, as shown in FIG. 5, the battery pack includes the battery cell 111 corresponding to a power source and the circuit board 116. The circuit board 116 includes, for example, a control unit 121, a switch unit 122, a PTC 123, and a temperature detection unit 124. Because the battery cell 111 can be connected to the outside via a positive electrode terminal 125 and a negative electrode terminal 127, the battery cell 111 is charged and discharged via the positive electrode terminal 125 and the negative electrode terminal 127. The temperature detection unit 124 is capable of detecting the temperature using a temperature detection terminal (so-called T terminal) 126.

The control unit 121 controls the operation of the entire battery pack (including the use state of the battery cell 111), and includes a central processing unit (CPU), a memory, and the like.

For example, when the battery voltage reaches the overcharge detection voltage, the control unit 121 disconnects the switch unit 122 so that no charging current flows through the current path of the battery cell 111. Further, for example, when a large amount of current flows during charging, the control unit 121 disconnects the switch unit 122 and cuts off the charging current.

In addition thereto, for example, when the battery voltage reaches the overdischarge detection voltage, the control unit 121 disconnects the switch unit 122 so that no discharge current flows through the current path of the battery cell 111. Further, for example, when a large amount of current flows during discharging, the control unit 121 cuts off the discharge current by disconnecting the switch unit 122.

Note that the overcharge detection voltage of the secondary battery is, for example, 4.20 V±0.05 V. The overdischarge detection voltage is, for example, 2.4 V±0.1 V.

The switch unit 122 switches the use state of the battery cell 111 (availability of the connection between the battery cell 111 and an external apparatus) according to an instruction from the control unit 121. This switch unit 122 includes a charge control switch, a discharge control switch, and the like. The charge control switch and the discharge control switch are, for example, semiconductor switches such as field effect transistors (MOSFETs) using a metal oxide semiconductor. Note that the charge/discharge current is detected on the basis of, for example, the ON resistance of the switch unit 122.

The temperature detection unit 124 measures the temperature of the battery cell 111, outputs the measurement result to the control unit 121, and includes, for example, a temperature detection element such as a thermistor. Note that the measurement result by the temperature detection unit 124 is used in the case where the control unit 121 performs charge and discharge control at the time of abnormal heat generation or where the control unit 121 performs correction processing at the time of calculation of the remaining capacity, or the like.

Note that the circuit board 116 does not necessary need to include the PTC 123. In this case, a separate PTC element may be attached to the circuit board 116.

3. Third Embodiment

Figure 6:
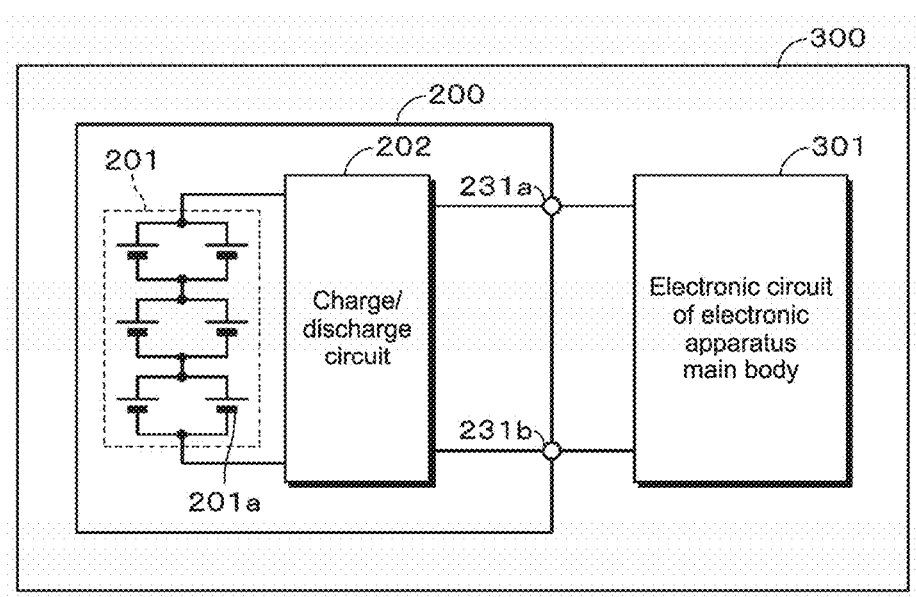
FIG. 6 is a block diagram showing a configuration example of an electronic apparatus according to a third embodiment of the present technology.

In a third embodiment of the present technology, an example of a configuration of an electronic apparatus will be described with reference to FIG. 6.

An electronic device 300 includes an electronic circuit 301 of the electronic apparatus main body, and a battery pack 200. The battery pack 200 is electrically connected to the electronic circuit 301 via a positive electrode terminal 231a and a negative electrode terminal 231b. The electronic apparatus 300 has a configuration in which a user can detachably attach the battery pack 200, for example. Note that the configuration of the electronic apparatus 300 is not limited thereto, and the battery pack 200 may be built in the electronic apparatus 300 so that the user can not remove the battery pack 200 from the electronic apparatus 300.

When charging the battery pack 200, the positive electrode terminal 231a and the negative electrode terminal 231b of the battery pack 200 are respectively connected to a positive electrode terminal and a negative electrode terminal of a charger (not shown). Meanwhile, when discharging the battery pack 200 (when using the electronic apparatus 300), the positive electrode terminal 231a and the negative electrode terminal 231b of the battery pack 200 are respectively connected to a positive electrode terminal and a negative electrode terminal of the electronic circuit 301.

Examples of the electronic apparatus 300 include, but not limited to, a laptop personal computer, a tablet computer, a mobile phone (smart phone, etc.), personal digital assistants (PDA), a display apparatus (LCD, EL display, electronic paper, head mounted display (HMD) etc.), an imaging apparatus (digital still camera, digital video camera etc.), audio equipment (portable audio player, etc.), game equipment, cordless phone handset, an E-book, an electronic dictionary, a radio, a headphone, a navigation system, a memory card, a pacemaker, a hearing aid, an electric tool, an electric shaver, a refrigerator, an air conditioner, a television receiver, a stereo, a water heater, a microwave, a dishwasher, a washing machine, a dryer, lighting equipment, a toy, medical equipment, a robot, a road conditioner, and a traffic light.

(Electronic Circuit)

The electronic circuit 301 includes, for example, a CPU, a peripheral logic unit, an interface unit, a storage unit, and the like, and controls the entire electronic apparatus 300.

(Battery Pack)

The battery pack 200 is a battery pack of an assembled battery including an assembled battery 201 and a charge/discharge circuit 202. The assembled battery 201 is configured by connecting a plurality of secondary batteries 201a in series and/or in parallel. The plurality of secondary batteries 201a are connected to each other in the form of, for example, n batteries in parallel and m batteries in series (n and m each represent a positive integer). Note that in FIG. 6, an example in which six secondary batteries 201a are connected two each other in the form of 2 batteries in parallel and 3 batteries in series (2P3S) is shown. As the secondary battery 201a, the battery according to the first embodiment is used.

At the time of charging, the charge/discharge circuit 202 controls charging of the assembled battery 201. Meanwhile, at the time of discharging (i.e., when using the electronic apparatus 300), the charge/discharge circuit 202 controls discharging of the electronic apparatus 300.

Instead of the battery pack 200, the battery according to the first embodiment or the battery pack of the single battery according to the second embodiment may be used.

4. Fourth Embodiment

In a fourth embodiment of the present technology, an example of a power storage system including the battery according to the first embodiment in a power storage apparatus will be described.

This power storage system may be of any kind as long as it uses electric power, and includes merely a power apparatus. This power system includes, for example, a smart grid, a household energy management system (HEMS), a vehicle, and the like, and can also store electricity.

The power storage apparatus (power storage module) is applied to, for example, a power source for power storage for buildings including houses or power generation facilities. An example of the power storage apparatus is a power storage module including a battery block in which a plurality of batteries are connected in at least one of parallel and series and a control unit that controls charge and discharge of these battery blocks. An example of the configuration of the power storage apparatus is, for example, one in which a plurality of battery blocks are housed in an outer case. As the battery, the battery according to the first embodiment can be used.

Examples of the power storage system include the following first to fifth power storage systems. A first power storage system is a power storage system having a power storage apparatus charged by a power generation apparatus that generates power from renewable energy. A second power storage system has a power storage apparatus, and provides power to an electronic apparatus connected to the power storage apparatus. A third power storage system is a power storage system including an electronic apparatus that receives power supply from a power storage apparatus. These power storage systems are realized as a system that efficiently supplies power in cooperation with an external power supply network.

A fourth power storage system is a power system that includes a power information transmitting-receiving unit that transmits/receives signals to/from other apparatuses via a network and controls the charge and discharge of the above-mentioned power storage apparatus on the basis of information received by the transmitting-receiving unit. A fifth power storage system is a power system that receives power supply from the above-mentioned power storage apparatus or provides the power storage apparatus with power from a power generation apparatus or a power network. The power storage system applied to a house and an electric vehicle will be described below.

(Configuration of Power Storage System)

Figure 7:
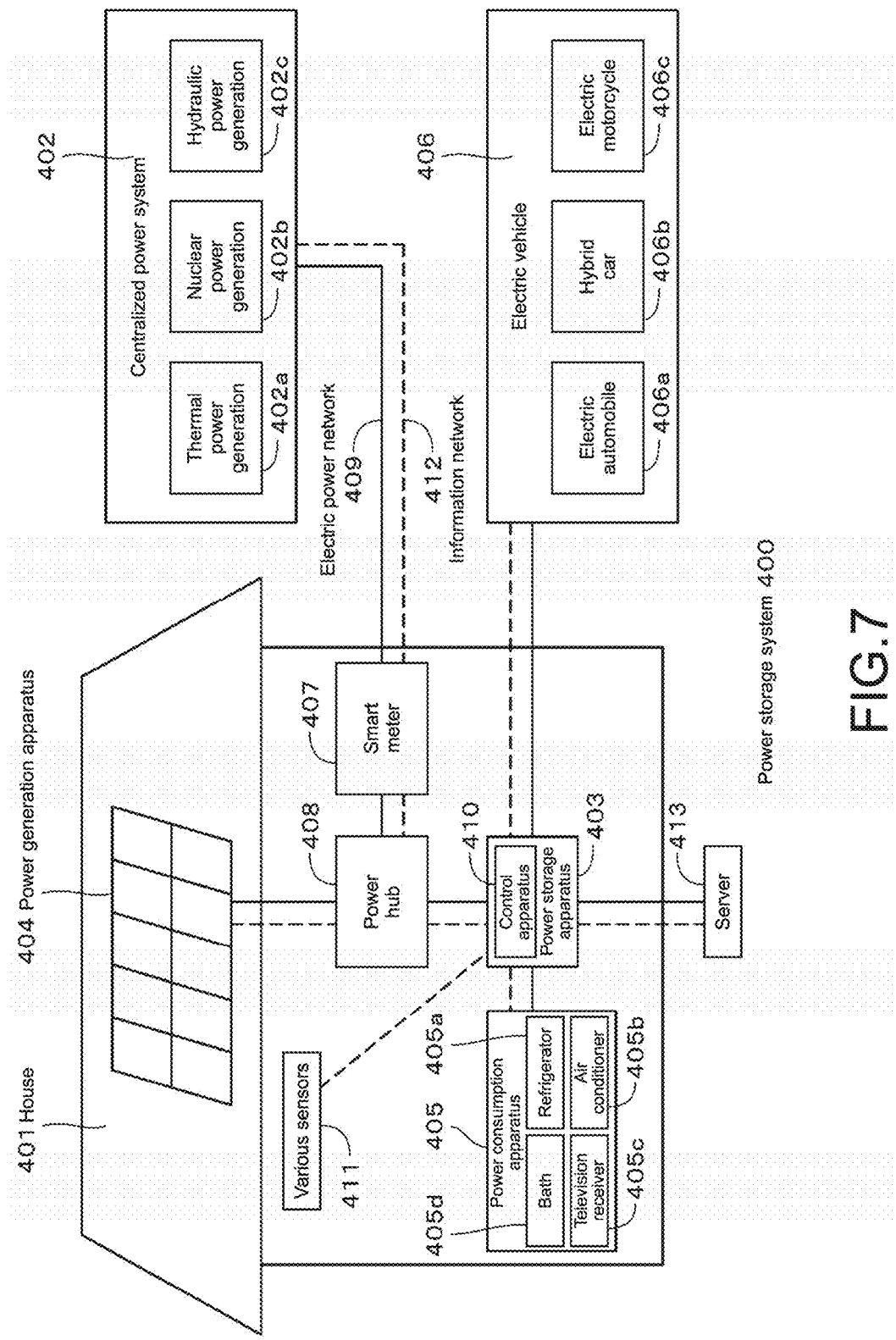
FIG. 7 is a schematic diagram showing a configuration example of a power storage system according to a fourth embodiment of the present technology.

Hereinafter, a configuration example of a power storage system (power system) 400 according to the fourth embodiment will be described with reference to FIG. 7. This power storage system 400 is a power storage system for a house, and electric power is supplied from a centralized power system 402 such as a thermal power generation 402a, a nuclear power generation 402b, and a hydraulic power generation 402c to a power storage apparatus 403 via an electric power network 409, an information network 412, a smart meter 407, the power hub 408, and the like. In addition, electric power is supplied from an independent power source such as a domestic power generation apparatus 404 to the power storage apparatus 403. The electric power supplied to the power storage apparatus 403 is stored. The power storage apparatus 403 is used to supply electric power to be used in the house 401. It is not limited to the house 401, and a similar power storage system can be used for a building.

In the house 401, the domestic power generation apparatus 404, a power consumption apparatus 405, the power storage apparatus 403, a control apparatus 410 that controls each apparatus, the smart meter 407, the power hub 408, and sensors 411 that acquire various types of information are provided. The respective apparatuses are connected to one another via the electric power network 409 and the information network 412. As the domestic power generation apparatus 404, a solar battery, a fuel battery, and the like are used. The generated electric power is supplied to the power consumption apparatus 405 and/or the power storage apparatus 403. The power consumption apparatus 405 includes, for example, a refrigerator 405a, an air conditioner 405b, a television receiver 405c, and a bath 405d. Further, the power consumption apparatus 405 includes an electric vehicle 406. The electric vehicle 406 is an electric automobile 406a, a hybrid car 406b, or an electric motorcycle 406c.

The power storage apparatus 403 includes one or more batteries according to the first embodiment. The smart meter 407 has a function of monitoring the amount of use of commercial electric power and transmitting the measured amount of use to an electric power company. The power supply of the electric power network 409 may be any one of direct-current power supply, alternating current power supply, and non-contact power supply or combination thereof.

Examples of the various sensors 411 include a motion sensor, an illuminance sensor, an object detection sensor, a power consumption sensor, a vibration sensor, a contact sensor, a temperature sensor, and an infrared sensor. The information acquired by the various sensors 411 is transmitted to the control apparatus 410. On the basis of the information from the sensors 411, a weather state, a person state, and the like are grasped, and it is possible to minimize the energy consumption by automatically controlling the power consumption apparatus 405. Further, the control apparatus 410 is capable of transmitting information on the house 401 to the external electric power company and the like via the Internet.

The power hub 408 executes processing such as branching of a power line and direct current/alternating current conversion. Examples of the communication system of the information network 412 connected to the control apparatus 410 include a method of using a communication interface such as a UART (Universal Asynchronous Receiver-Transceiver: transmission/reception circuit for asynchronous serial communication), and a method of using a sensor network that conforms to wireless communication standards such as Bluetooth (registered trademark), ZigBee, and Wi-Fi. The Bluetooth (registered trademark) system is applied to multimedia communication, and one-to-many connection communication can be performed. ZigBee uses the physical layer of IEEE (Institute of Electrical and Electronics Engineers) 802.15.4. The IEEE802.15.4 is a name of a short-range wireless network standard called PAN (Personal Area Network) or W (Wireless) PAN.

The control apparatus 410 is connected to an external server 413. This server 413 may be managed by any one of the house 401, the electric power company, and a service provider. Information transmitted/received to/from the server 413 is, for example, power consumption information, life pattern information, electric power charge, weather information, disaster information, or information on power transaction. Such information may be transmitted/received to/from the domestic power consumption apparatus (e.g., television receiver). However, it may be transmitted/received to/from an apparatus (e.g., mobile phone) outside the house. Such information may be displayed on an apparatus having a display function such as a television receiver, a mobile phone, and a PDA.

The control apparatus 410 that controls the respective blocks includes a CPU, a RAM, a ROM, and the like, and is stored in the power storage apparatus 403 in this example. The control apparatus 410 is connected to the power storage apparatus 403, the domestic power generation apparatus 404, the power consumption apparatus 405, the various sensors 411, and the server 413 via the information network 412. The control apparatus 410 has a function of adjusting the amount of use of commercial electric power and the amount of power generation, for example. Note that the control apparatus 410 may additionally have a function of performing power transaction in a power market, for example.

As described above, electric power generated not only by the centralized power system 402 such as the thermal power generation 402a, the nuclear power generation 402b, and the hydraulic power generation 402c but also by the domestic power generation apparatus 404 (solar power generation, wind power generation) can be stored in the power storage apparatus 403. Therefore, even when the amount of electric power generated by the domestic power generation apparatus 404 fluctuates, it is possible to perform control, e.g., keep the amount of electric power transmitted to the outside constant or discharge only a necessary amount of electric power. For example, a possible method is to store electric power obtained by solar power generation in the power storage apparatus 403, and store cheaper midnight electric power in the power storage apparatus 403 at night and use the electric power stored in the power storage apparatus 403 by discharging it in the daytime when power is more expensive.

Note that although the example in which the control apparatus 410 is housed in the power storage apparatus 403 has been described in this example, the control apparatus 410 may be housed in the smart meter 407 or may be independently configured. Further, the power storage system 400 may be used for a plurality of houses in an apartment building or for a plurality of detached houses.

5. Fifth Embodiment

In a fifth embodiment of the present technology, an example of an electric vehicle including the battery according to the first embodiment will be described. Examples of the electric vehicle include railway vehicles, golf carts, electric carts, electric automobiles (including hybrid vehicles), and agricultural work vehicles (tractors, combines, etc.).

Figure 8:
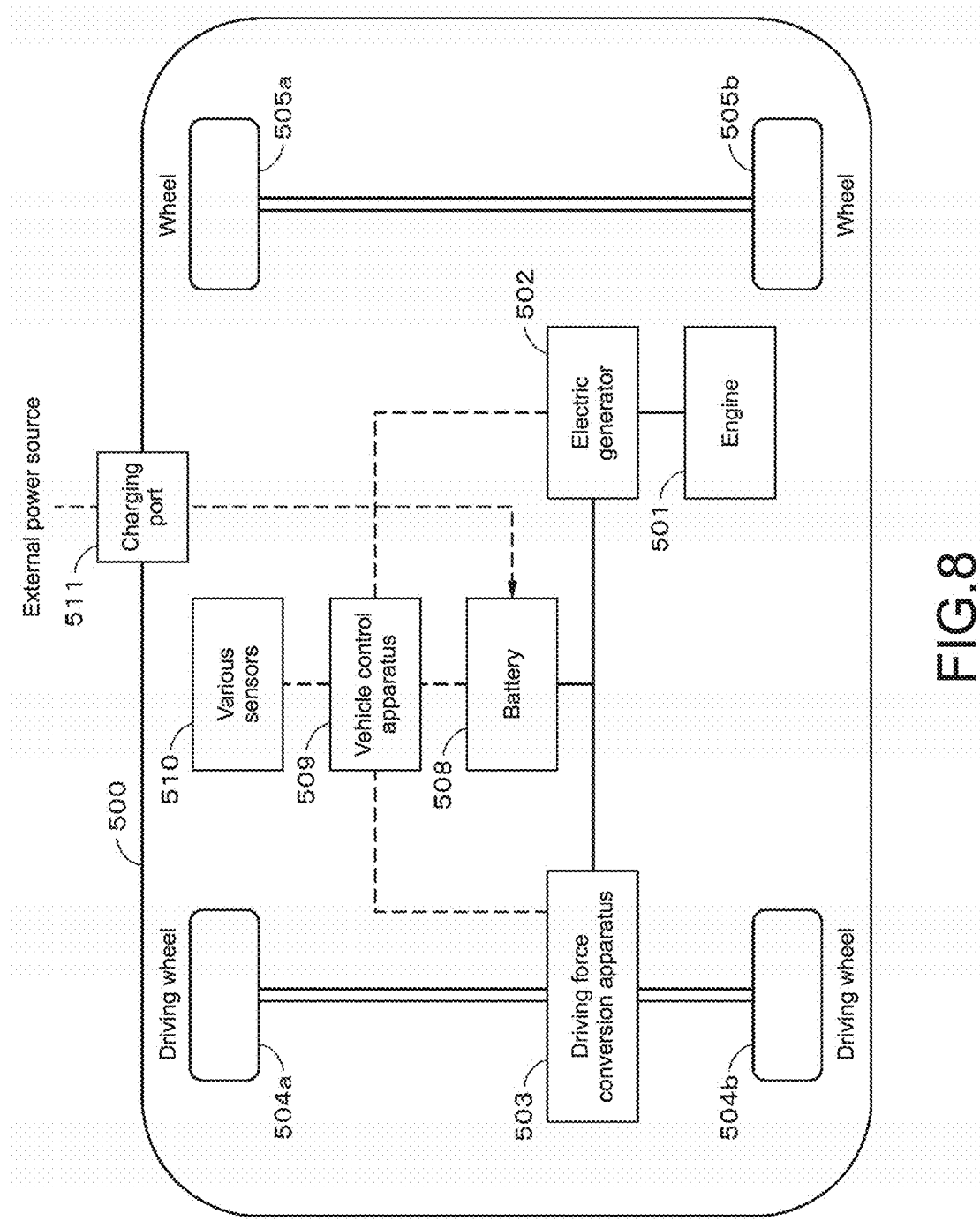
FIG. 8 is a schematic diagram showing a configuration example of an electric vehicle according to a fifth embodiment of the present technology.

A configuration example of an electric vehicle according to a fifth embodiment of the present technology will be described with reference to FIG. 8. This hybrid vehicle 500 is a hybrid vehicle that employs a series hybrid system. A vehicle of the series hybrid system runs with an electric power/driving force conversion apparatus 503 by using electric power generated in an electric generator driven by an engine or electric power temporarily stored in a battery.

This hybrid vehicle 500 includes an engine 501, an electric generator 502, the electric power/driving force conversion apparatus 503, a driving wheel 504a, a driving wheel 504b, a wheel 505a, a wheel 505b, a battery 508, a vehicle control apparatus 509, various sensors 510, and a charging port 511. As the battery 508, the battery according to the first embodiment is used.

The hybrid vehicle 500 runs by using the electric power/driving force conversion apparatus 503 as a power source. An example of the electric power/driving force conversion apparatus 503 is a motor. The electric power/driving force conversion apparatus 503 is actuated due to electric power of the battery 508 and torque of the electric power/driving force conversion apparatus 503 is transmitted to the driving wheels 504a and 504b. Note that the electric power/driving force conversion apparatus 503 can be applied as both of an alternating-current motor and a direct-current motor by using direct current-alternating current (DC-AC) or reverse conversion (AC-DC conversion) at a necessary portion. The various sensors 510 controls r.p.m. of the engine via the vehicle control apparatus 509, opening (throttle opening) of a throttle valve (not shown), and the like. The various sensors 510 include a velocity sensor, an acceleration sensor, an engine r.p.m. sensor, and the like.

The torque of the engine 501 is transmitted to the electric generator 502, and electric power generated with the torque by the electric generator 502 can be stored in the battery 508.

When the hybrid vehicle 500 is decelerated by a braking mechanism (not shown), resistance force at the time of the deceleration is added to the electric power/driving force conversion apparatus 503 as torque, and regenerative electric power generated with this torque by the electric power/driving force conversion apparatus 503 is stored in the battery 508.

By being connected to a power source outside the hybrid vehicle 500 via the charging port 511, the battery 508 is also capable of receiving electric power supply from the external power source by using the charging port 511 as an input port, and storing the received electric power.

Although not shown in the figure, an information processing apparatus that executes information processing relating to vehicle control on the basis of information on a battery may be provided. Examples of such an information processing apparatus include an information processing apparatus that displays the remaining capacity of the battery on the basis of information on the remaining capacity of the battery.

Note that the series hybrid vehicle that runs with the motor by using electric power generated by the electric generator driven by the engine or electric power temporarily stored in the battery has been described above as an example. However, the present technology can be effectively applied also to a parallel hybrid vehicle that uses output of an engine and output of a motor as driving sources and appropriately switches three systems of running with only the engine, running with only the motor, and running with the engine and the motor for the use. Further, the present technology can be effectively applied also to a so-called electric vehicle, which does not use an engine and runs by driving of only a driving motor.

EXAMPLE

Hereinafter, the present technology will be described in detail by examples. It should be noted that the present technology is not limited to the configuration of the following embodiments.

Example 1-1

(Preparation of Positive Electrode)

Ninety % by mass of lithium cobalt oxide ($LiCoO_2$) as a positive electrode active material, 5% by mass of carbon black as a conductive agent, and 5% by mass of polyvinylidene fluoride as a binding agent were mixed, and then dispersed in N-methyl-2-pyrrolidone (NMP) to prepare a positive electrode mixture slurry. Next, this positive electrode mixture slurry was applied to both surfaces of a positive electrode current collector formed of a strip-shaped aluminum foil, dried, and then compression-molded to form a positive electrode active material layer. After that, a positive electrode lead was welded and attached to one end of the positive electrode current collector.

(Preparation of Negative Electrode)

Ninety six % by mass of graphite as a negative electrode active material, 1.5% by mass of an acrylic acid-modified product of a styrene-butadiene copolymer as a binding agent, 1.5% by mass of carboxymethylcellulose, and an appropriate amount of water were stirred to prepare a negative electrode mixture slurry. Next, this negative electrode mixture slurry was uniformly applied to both surfaces of a negative electrode current collector formed of a strip-shaped copper foil, dried, and compression-molded to form a negative electrode active material layer. After that, a negative electrode lead was welded and attached to one end of the negative electrode current collector.

(Formation of Electrolyte Layer)

A gel electrolyte layer was formed as follows. First, a polymer compound, a non-aqueous electrolyte solution, and dimethyl carbonate (DMC) as a diluent solvent were mixed, stirred, and dissolved to obtain a sol electrolyte solution.

As the polymer compound, a copolymer having two kinds of repeating units represented by a formula (1-1) (referred to as "copolymer 1") was used. Note that numerals attached outside the parentheses in the formula (1-1) indicate a molar ratio of the repeating unit (left formula:right formula)=n:m (the same applies to the following formulae (1-1) to (1-15) and (2-1)). The electrolyte solution was prepared by mixing ethylene carbonate (EC) and propylene carbonate (PC) at a volume ratio (EC:PC) of 5:5 and dissolving 1.0 mol/kg of $LiPF_6$ therein. The mixing ratio of the polymer compound in the electrolyte solution, the electrolyte solution, and DMC was adjusted to 1:6:12 by mass ratio (polymer compound: electrolyte solution:DMC).

[Chem. 4]

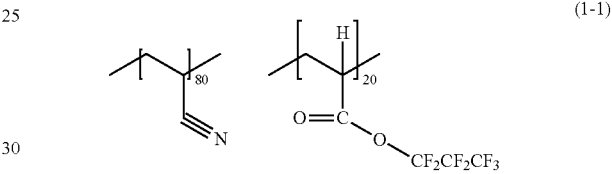

(1-1)

The obtained sol electrolyte solution was uniformly applied to both surfaces of the positive electrode and both surfaces of the negative electrode. After that, the solvent was removed by drying at 80° C. for 2 minutes. As a result, a gel electrolyte layer was formed on both sides of the positive electrode and both sides of the negative electrode. The gel electrolyte layer was formed so as to cover all of the positive electrode active material layer and the negative electrode active material layer.

(Assembly of Laminated Film Type Battery)

Next, a microporous polyethylene film was prepared as a separator. Next, the positive electrode and the negative electrode having the electrolyte layers formed on both sides thereof, and the separator were laminated in the order of the positive electrode, the separator, the negative electrode, and the separator, and then wound, and the winding end portion was fixed with an adhesive tape, thereby forming a wound electrode body.

Next, as an exterior member, two laminated films having a structure in which an aluminum foil was sandwiched between a pair of resin films were prepared. Next, the wound electrode body was sandwiched between the two laminated films, and after an adhesion film was inserted between the positive electrode lead and the negative electrode lead and the laminate film, one side around the wound electrode body from which the positive electrode lead and the negative electrode lead were led out, and the other three sides were sealed by thermal fusion under reduced pressure and hermetically sealed. In this way, a laminated film type battery was prepared.

Example 2-1

The copolymer 1 and a vinylidene fluoride-hexafluoropropylene copolymer (P(VdF-HFP)) were used as a polymer compound. The mass ratio (copolymer 1:PVdF) of the copolymer 1 and P(VdF-HFP) was adjusted to 50:50. A laminated film type battery was prepared similarly to Example 1-1 except for the above.

Example 2-2

The mass ratio of the copolymer 1 and P(VdF-HFP) was adjusted to 20:80. A laminated film type battery was prepared similarly to Example 2-1 except for the above.

Example 2-3

As a polymer compound, a copolymer having two kinds of repeating units represented by a formula (1-2) (referred to as "copolymer 2") was used instead of the copolymer 1. A laminated film type battery was prepared similarly to Example 2-1 except for the above.

[Chem. 5]

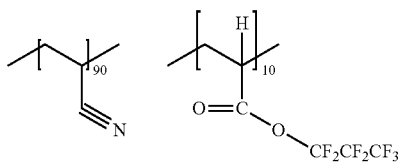

(1-2)

Example 2-4

As a polymer compound, a copolymer having two kinds of repeating units represented by a formula (1-3) (referred to as "copolymer 3") was used instead of the copolymer 1. A laminated film type battery was prepared similarly to Example 2-1 except for the above.

[Chem. 6]

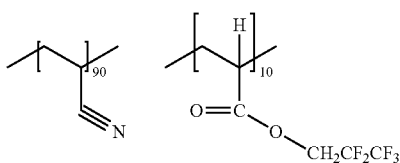

(1-3)

Example 2-5

As a polymer compound, a copolymer having two kinds of repeating units represented by a formula (1-4) (referred to as "copolymer 4") was used instead of the copolymer 1. A laminated film type battery was prepared similarly to Example 2-1 except for the above.

[Chem. 7]

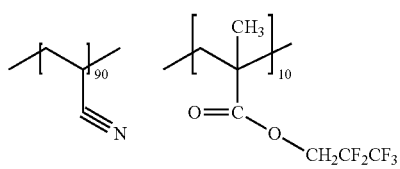

(1-4)

Example 2-6

As a polymer compound, a copolymer having two kinds of repeating units represented by a formula (1-5) (referred to as "copolymer 5") was used instead of the copolymer 1. A laminated film type battery was prepared similarly to Example 2-1 except for the above.

[Chem. 8]

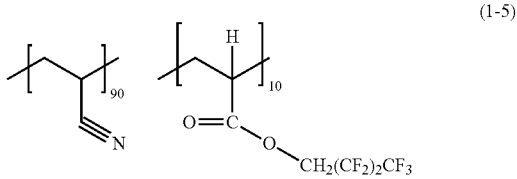

(1-5)

Example 2-7

As a polymer compound, a copolymer having two kinds of repeating units represented by a formula (1-6) (referred to as "copolymer 6") was used instead of the copolymer 1. A laminated film type battery was prepared similarly to Example 2-1 except for the above.

[Chem. 9]

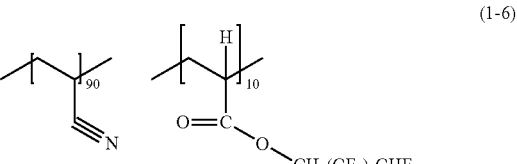

(1-6)

Example 2-8

As a polymer compound, a copolymer having two kinds of repeating units represented by a formula (1-7) (referred to as "copolymer 7") was used instead of the copolymer 1. A laminated film type battery was prepared similarly to Example 2-1 except for the above.

[Chem. 10]

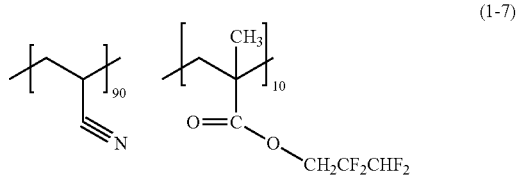

(1-7)

Example 2-9

As a polymer compound, a copolymer having two kinds of repeating units represented by a formula (1-8) (referred to as "copolymer 8") was used instead of the copolymer 1. A laminated film type battery was prepared similarly to Example 2-1 except for the above.

[Chem. 11]

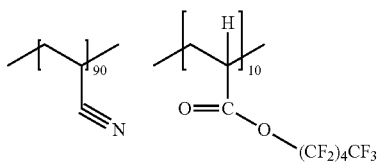
(1-8)

Example 2-10

As a polymer compound, a copolymer having two kinds of repeating units represented by a formula (1-9) (referred to as "copolymer 9") was used instead of the copolymer 1. A laminated film type battery was prepared similarly to Example 2-1 except for the above.

[Chem. 12]

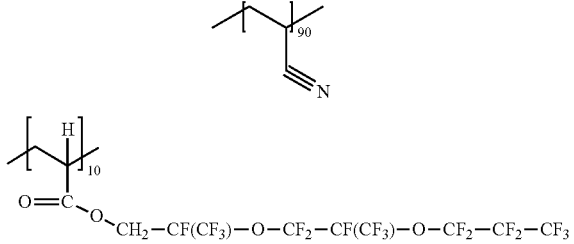
(1-9)

Example 2-11

As a polymer compound, a copolymer having two kinds of repeating units represented by a formula (1-10) (referred to as "copolymer 10") was used instead of the copolymer 1. A laminated film type battery was prepared similarly to Example 2-1 except for the above.

[Chem. 13]

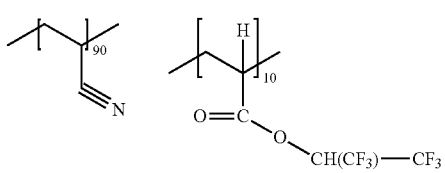
(1-10)

Example 2-12

As a polymer compound, a copolymer having two kinds of repeating units represented by a formula (1-11) (referred to as "copolymer 11") was used instead of the copolymer 1. A laminated film type battery was prepared similarly to Example 2-1 except for the above.

[Chem. 14]

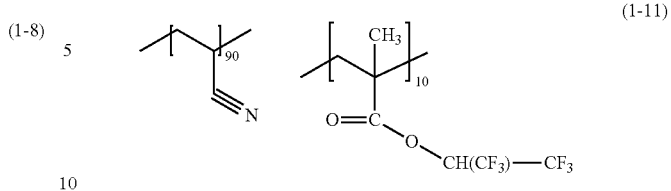
(1-11)

Example 2-13

As a polymer compound, a copolymer having two kinds of repeating units represented by a formula (1-12) (referred to as "copolymer 12") was used instead of the copolymer 1. A laminated film type battery was prepared similarly to Example 2-1 except for the above.

[Chem. 15]

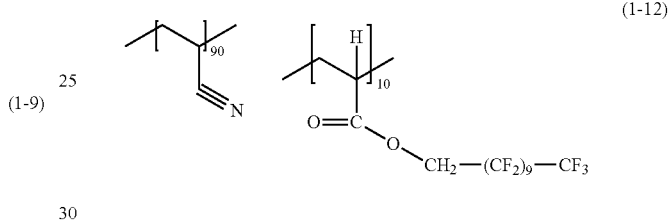
(1-12)

Example 2-14

As a polymer compound, a copolymer having two kinds of repeating units represented by a formula (1-13) (referred to as "copolymer 13") was used instead of the copolymer 1. A laminated film type battery was prepared similarly to Example 2-1 except for the above.

[Chem. 16]

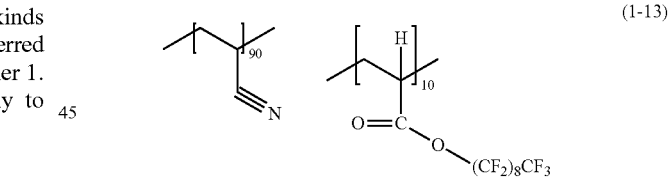
(1-13)

Example 2-15

As a polymer compound, a copolymer having two kinds of repeating units represented by a formula (1-14) (referred to as "copolymer 14") was used instead of the copolymer 1. A laminated film type battery was prepared similarly to Example 2-1 except for the above.

[Chem. 17]

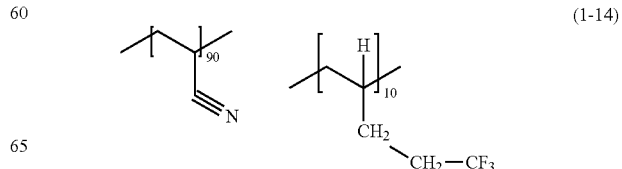
(1-14)

Example 2-16

As a polymer compound, a copolymer having two kinds of repeating units represented by a formula (1-15) (referred to as "copolymer 15") was used instead of the copolymer 1. A laminated film type battery was prepared similarly to Example 2-1 except for the above.

[Chem. 18]

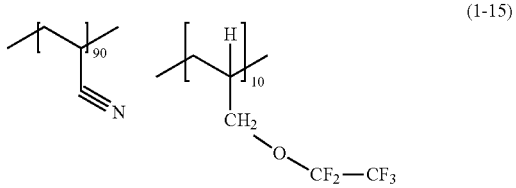

(1-15)

Example 2-17

As a polymer compound, a copolymer having two kinds of repeating units represented by a formula (1-16) (referred to as "copolymer 16") was used instead of the copolymer 1. A laminated film type battery was prepared similarly to Example 2-1 except for the above. Note that numerals attached outside the parentheses in the formula (1-16) indicate a molar ratio of the repeating unit (left formula:middle formula:right formula)=n:m:o.

[Chem. 19]

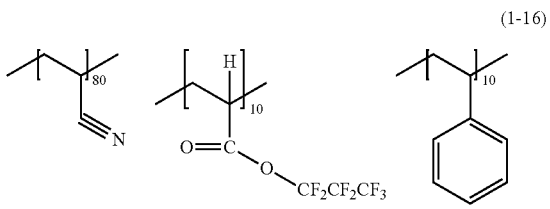

(1-16)

Comparative Example 1

P(VdF-HFP) was used as a polymer compound instead of the copolymer 1. A laminated film type battery was prepared similarly to Example 1-1 except for the above.

Comparative Example 2

As a polymer compound, a homopolymer having one kind of repeating unit represented by a formula (2-1) (referred to as "homopolymer 1") was used instead of the copolymer 1. This homopolymer 1 is polyacrylonitrile. A laminated film type battery was prepared similarly to Example 1-1 except for the above.

[Chem. 20]

(2-1)

Comparative Example 3

As a polymer compound, the homopolymer 1 was used instead of the copolymer 1. A laminated film type battery was prepared similarly to Example 2-1 except for the above.

Comparative Example 4

As a polymer compound, a copolymer (referred to as "copolymer 17") having two kinds of repeating units represented by a formula (2-2) was used instead of the copolymer 1. A laminated film type battery was prepared similarly to Example 2-1 except for the above.

[Chem. 21]

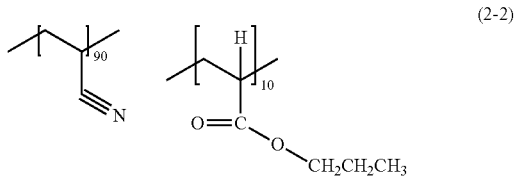

(2-2)

Comparative Example 5

As a polymer compound, polychlorotrifluoroethylene (PCTFE) was used instead of the copolymer 1. A laminated film type battery was prepared similarly to Example 2-1 except for the above.

(Evaluation)

For each Example and each Comparative Example, "high temperature cycle characteristics" was evaluated as battery evaluation, and "electrolyte strength" and "mixability" were evaluated as electrolyte evaluation.

(High Temperature Cycle Characteristics)

Charging was performed at current density of 1 mA/cm$^2$ in a 45° C. environment until the battery voltage reached 4.35 V or 4.4 V, and then until the current density reached 0.02 mA/cm$^2$ while keeping the upper limit voltage. After that, discharging was performed at current density of 1 mA/cm$^2$ until the battery voltage reached the end voltage (3.0 V). This charge and discharge were repeated, and the discharge capacity retention rate [{"discharge capacity at the 100th cycle"/"discharge capacity at the first cycle"}×100 (%)] at the 100th cycle to the discharge capacity at the first cycle was obtained.

(Evaluation of Electrolyte Strength)

A gel electrolyte was placed in a coin cell container, and then caulked, thereby preparing a coin cell. After that, the coin cell was disassembled. It was determined as "good" when the dissembled electrolyte kept the thickness since the gel electrolyte was put in the container, as "possible" when the thickness was reduced than before putting the gel electrolyte in the container, and as "impossible" when the gel electrolyte was collapsed.

(Evaluation of Mixability)

Figure 9:
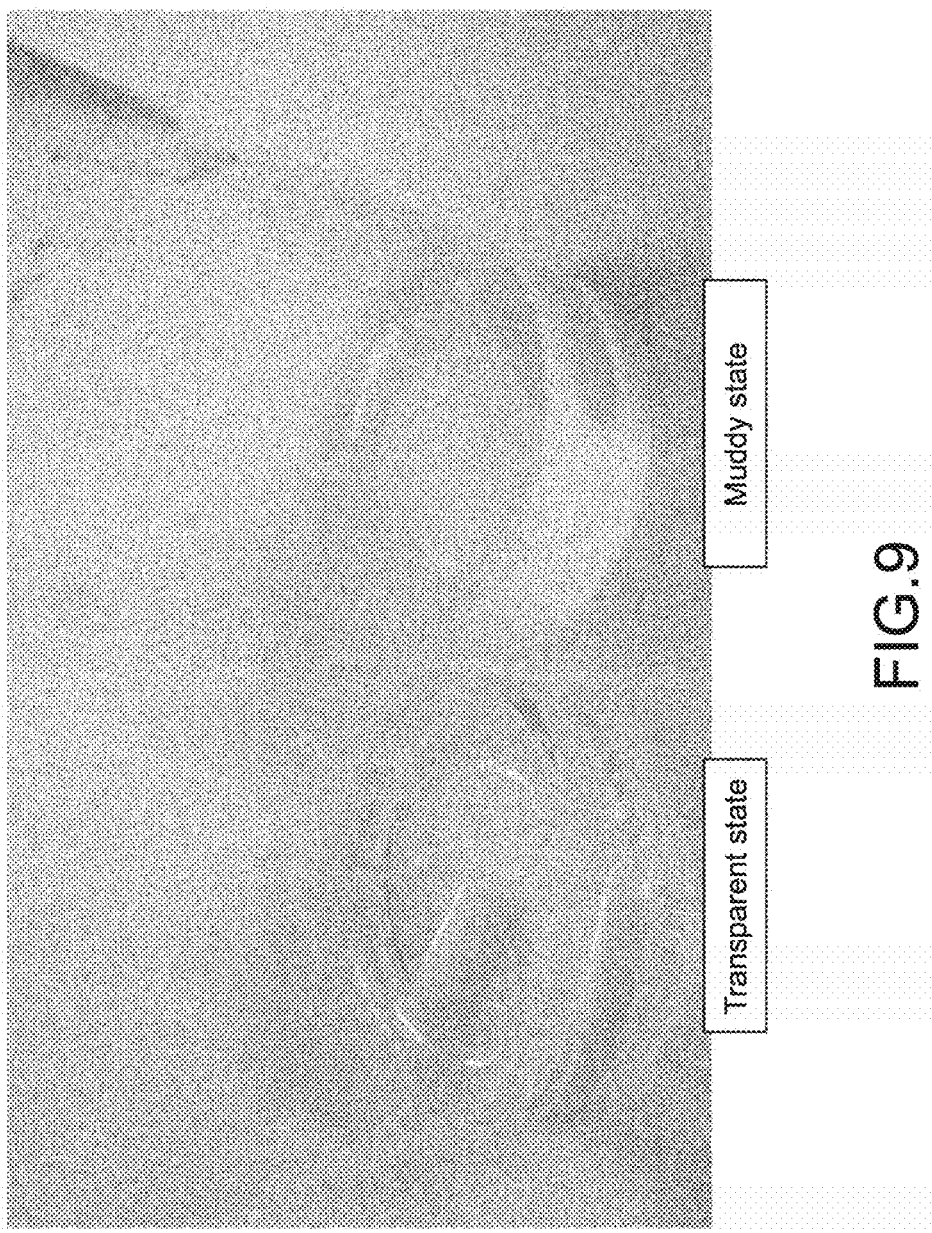
FIG. 9 is a photograph showing a transparent state and a muddy state of an electrolyte.

For an example using an electrolyte containing two or more kinds of polymer compounds, the mixability was evaluated. The mixability was evaluated by placing the gel electrolyte before application in a beaker and visually determining the transparency of the electrolyte. A state that is muddy to a degree shown in FIG. 9 or a state muddier than that were determined as x, and a state with higher transparency than in a muddy state as in the transparent state shown in FIG. 9 was determined as O.

Evaluation results are shown in Table 1. Further, Table 2 shows the correspondence between the copolymers 1 to 17 and the general formula (1) or general formula (1a).

TABLE 1

| | Polymer compound | | | | Electrolyte evaluation | | Battery evaluation | |
|---|---|---|---|---|---|---|---|---|
| | Mass ratio | | | Kind of | | | Discharge capacity retention rate | Discharge capacity retention rate |
| | Polymer A | P(VdF-HFP) | PCTFE | polymer A | Mixability | Strength | (4.35 V) [%] | (4.40 V) [%] |
| Example 1-1 | 100 | 0 | 0 | Copolymer 1 | — | Good | 65.8 | 57.1 |
| Example 2-1 | 50 | 50 | 0 | Copolymer 1 | ○ | Good | 75.5 | 63.3 |
| Example 2-2 | 20 | 80 | 0 | Copolymer 1 | ○ | Good | 67.6 | 58.8 |
| Example 2-3 | 50 | 50 | 0 | Copolymer 2 | ○ | Good | 77.1 | 65.7 |
| Example 2-4 | 50 | 50 | 0 | Copolymer 3 | ○ | Possible | 75.4 | 65.2 |
| Example 2-5 | 50 | 50 | 0 | Copolymer 4 | ○ | Possible | 70.7 | 59.7 |
| Example 2-6 | 50 | 50 | 0 | Copolymer 5 | ○ | Good | 69.9 | 60.6 |
| Example 2-7 | 50 | 50 | 0 | Copolymer 6 | ○ | Possible | 70.2 | 59.5 |
| Example 2-8 | 50 | 50 | 0 | Copolymer 7 | ○ | Good | 70.8 | 61.3 |
| Example 2-9 | 50 | 50 | 0 | Copolymer 8 | ○ | Good | 69.9 | 60.6 |
| Example 2-10 | 50 | 50 | 0 | Copolymer 9 | ○ | Good | 67.8 | 58.3 |
| Example 2-11 | 50 | 50 | 0 | Copolymer 10 | ○ | Good | 74.5 | 63.7 |
| Example 2-12 | 50 | 50 | 0 | Copolymer 11 | ○ | Good | 74.0 | 63.0 |
| Example 2-13 | 50 | 50 | 0 | Copolymer 12 | ○ | Good | 65.9 | 57.1 |
| Example 2-14 | 50 | 50 | 0 | Copolymer 13 | ○ | Good | 67.9 | 58.3 |
| Example 2-15 | 50 | 50 | 0 | Copolymer 14 | ○ | Possible | 67.7 | 59.2 |
| Example 2-16 | 50 | 50 | 0 | Copolymer 15 | ○ | Possible | 68.1 | 58.8 |
| Example 2-17 | 50 | 50 | 0 | Copolymer 16 | ○ | Good | 77.3 | 66.4 |
| Comparative Example 1 | 0 | 100 | 0 | — | — | Good | 64.3 | 55.2 |
| Comparative Example 2 | 100 | 0 | 0 | Homopolymer 1 | — | Good | 51.2 | 44.8 |
| Comparative Example 3 | 50 | 50 | 0 | Homopolymer 1 | X | Impossible | — | — |
| Comparative Example 4 | 50 | 50 | 0 | Copolymer 17 | X | Impossible | — | — |
| Comparative Example 5 | 0 | 50 | 50 | — | ○ | Good | 50.5 | 43.8 |

| | General formula (1) or general formula (1a) | | | | | | |
|---|---|---|---|---|---|---|---|
| | X | Y | R1 | Z | n | m | o |
| Copolymer 1 | —CO—O— | —CF$_2$—CF$_2$—CF$_3$ | —H | — | 80 | 20 | — |
| Copolymer 2 | —CO—O— | —CF$_2$—CF$_2$—CF$_3$ | —H | — | 90 | 10 | — |
| Copolymer 3 | —CO—O— | —CH$_2$—CF$_2$—CF$_3$ | —H | — | 90 | 10 | — |
| Copolymer 4 | —CO—O— | —CH$_2$—CF$_2$—CF$_3$ | —CH$_3$ | — | 90 | 10 | — |
| Copolymer 5 | —CO—O— | —CH$_2$—(CF$_2$)$_2$—CF$_3$ | —H | — | 90 | 10 | — |
| Copolymer 6 | —CO—O— | —CH$_2$—(CF$_2$)$_3$—CHF$_2$ | —H | — | 90 | 10 | — |
| Copolymer 7 | —CO—O— | —CH$_2$—CF$_2$—CHF$_2$ | —CH$_3$ | — | 90 | 10 | — |
| Copolymer 8 | —CO—O— | —(CF$_2$)$_4$—CF$_3$ | —H | — | 90 | 10 | — |
| Copolymer 9 | —CO—O— | —CH$_2$—CF(CF$_3$)—O—CF$_2$—CF(CF$_3$)—O—CF$_2$—CF$_2$—CF$_3$ | —H | — | 90 | 10 | — |
| Copolymer 10 | —CO—O— | —CH(CF$_3$)—CF$_3$ | —H | — | 90 | 10 | — |
| Copolymer 11 | —CO—O— | —CH(CF$_3$)—CF$_3$ | —CH$_3$ | — | 90 | 10 | — |
| Copolymer 12 | —CO—O— | —CH$_2$—(CF$_2$)$_8$—CF$_3$ | —H | — | 90 | 10 | — |
| Copolymer 13 | —CO—O— | —(CF$_2$)$_8$—CF$_3$ | —H | — | 90 | 10 | — |
| Copolymer 14 | —CH$_2$— | —CH$_2$—CF$_3$ | —H | — | 90 | 10 | — |
| Copolymer 15 | —CH$_2$—O— | —CF$_2$—CF$_3$ | —H | — | 90 | 10 | — |
| Copolymer 16 | —CO—O— | —CF$_2$—CF$_2$—CF$_3$ | —H | 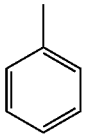 | 80 | 10 | 10 |
| Copolymer 17 | —CO—O— | —CH$_2$—CH$_2$—CH$_3$ | —H | — | 80 | 20 | — |

As shown in Table 1, in Example 1-1, the high charge voltage high temperature cycle characteristics could be improved. Further, in Example 1-1, the electrolyte strength was also good. In Examples 2-1 to 2-17, high charge voltage high temperature cycle characteristics could be improved. Further, in Examples 2-1 to 2-17, the strength and mixability of the electrolyte were also good.

6. Other Embodiments

Although the present technology has been described heretofore by embodiments and examples, the present technology is not limited to the above-mentioned embodiments and examples, and various modifications can be made without departing from the essence of the present technology.

For example, numerical values, structures, shapes, materials, raw materials, production processes, and the like mentioned in the above-mentioned embodiments and examples are merely examples, and different numerical values, structures, shapes, materials, raw materials, production processes, and the like may be used as necessary.

Further, the configurations, methods, steps, shapes, materials, numerical values, and the like of the above-mentioned embodiments and examples can be combined with each other as long as they do not depart from the essence of the present technology.

Further, the battery according to the present technology can be similarly applied to those having other battery structures such as square type, coin type, and button type. Further, for example, the battery according to the present technology may be a primary battery.

The present technology is also applicable to flexible batteries and the like mounted on wearable terminals such as a smart watch, a head mounted display, and iGlass (registered trademark).

It should be noted that the present technology may take the following configurations.

[1] An electrolyte, including:
an electrolyte solution; and
a polymer compound holding the electrolyte solution, in which
the polymer compound includes a copolymer having at least two kinds of repeating units represented by a general formula (1).

[Chem. 1]

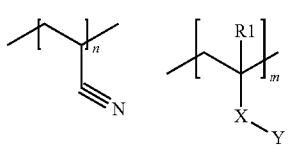

(1)

(In the formula, X represents a divalent hydrocarbon group or a divalent oxygen-containing group. Y represents a monovalent fluorine-containing hydrocarbon group. R1 represents a hydrogen group or a methyl group. n and m each represent a molar ratio (n:m) of the two kinds of repeating units.)

[2] The electrolyte according to [1], in which
the n and m satisfy the following relationship of $45 \leq n \leq 95$ and $5 \leq m \leq 55$.

[3] The electrolyte according to [1] or [2], in which the copolymer has at least three kinds of repeating units represented by a general formula (1a).

[Chem. 2]

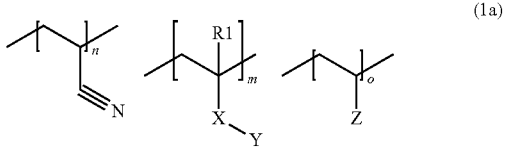

(1a)

(In the formula, X represents a divalent hydrocarbon group or a divalent oxygen-containing group. Y represents a monovalent fluorine-containing hydrocarbon group. R1 represents a hydrogen group or a methyl group. Z represents a monovalent organic group containing an aromatic ring. n, m, and o each represent a molar ratio (n:m:o) of the three kinds of repeating units.)

[4] The electrolyte according to [3], in which
the n, m, and o satisfy the following relationship of $45 \leq n \leq 95$, $5 \leq m \leq 55$, and $0 < o \leq 50$.

[5] The electrolyte according to any one of [1] to [4], in which
the polymer compound further contains a vinylidene fluoride polymer having at least a repeating unit derived from vinylidene fluoride.

[6] The electrolyte according to [5], in which
the vinylidene fluoride polymer is at least one of polyvinylidene fluoride and a vinylidene fluoride-hexafluoropropylene copolymer.

[7] The electrolyte according to [5] or [6], in which
a mass ratio of the copolymer and the vinylidene fluoride polymer is in a range of 20:80 to 50:50.

[8] The electrolyte according to any one of [1] to [7], further including particles.

[9] A battery, including:
a positive electrode;
a negative electrode; and
an electrolyte, in which
the electrolyte contains
an electrolyte solution, and
a polymer compound holding the electrolyte solution, and
the polymer compound includes a copolymer having at least two kinds of repeating units represented by a general formula (1).

[Chem. 3]

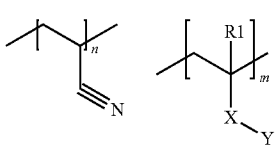

(1)

(In the formula, X represents a divalent hydrocarbon group or a divalent oxygen-containing group. Y represents a monovalent fluorine-containing hydrocarbon group. R1 represents a hydrogen group or a methyl group. n and m each represent a molar ratio (n:m) of the two kinds of repeating units.)

[10] The battery according to [9], in which
open circuit voltage in a fully charged state per pair of the positive and negative electrodes is not less than 4.25 V.

[11] A battery pack, including:
the battery according to [9] or [10]; and
a control unit that controls the battery.

[12] An electronic apparatus, that receives power supply from the battery according to [9] or [10].

[13] An electric vehicle, including:
the battery according to [9] or [10];
a converting apparatus that receives supply of power from the battery and converts the received power into a driving force for the electric vehicle; and
a control apparatus that performs information processing relating to vehicle control on the basis of information on the battery.

[14] A power storage apparatus, including:
the battery according to [9] or [10], in which
the power storage apparatus supplies power to an electronic apparatus connected to the battery.

[15] The power storage apparatus according to [14], further including
a power information control apparatus that transmits/receives a signal to/from another apparatus via a network, in which
the power storage apparatus controls, on the basis of information received by the power information control apparatus, charge and discharge of the battery.

[16] A power system, that receives power supply from the battery according to [9] or [10].

[17] The power system according to [16], in which
power is supplied from a power generation apparatus or a power network to the battery.

REFERENCE SIGNS LIST 30 wound electrode body
31 positive electrode lead
32 negative electrode lead
33 positive electrode
33A positive electrode current collector
33B positive electrode active material layer
34 negative electrode
34A negative electrode current collector
34B negative electrode active material layer
35 separator
36 electrolyte layer
37 protective tape
40 exterior member
41 adhesion film
111 battery cell (power source)
121 control unit
200 battery pack
201 assembled battery
201a secondary battery
300 electronic apparatus
400 power storage system
403 power storage apparatus
404 power generation apparatus
406 electric vehicle
409 electric power network
410 control apparatus
412 information network
503 driving force conversion apparatus
508 battery
509 vehicle control apparatus

The invention claimed is:

1. An electrolyte, comprising:
an electrolyte solution that comprises an electrolyte salt and a non-aqueous solvent to dissolve the electrolyte salt, wherein:
the non-aqueous solvent is ethylene carbonate, and
the electrolyte salt is a lithium salt; and
a polymer compound holding the electrolyte solution,
wherein the polymer compound includes a copolymer having at least two kinds of repeating units represented by a general formula (1)

[Chem. 1]

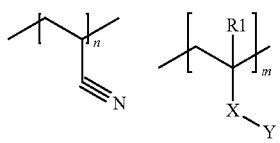

(1)

(In the formula, X represents an oxymethylene group, Y represents a pentafluoroethyl group, R1 represents a methyl group, n and m each represent a molar ratio (n:m) of the two kinds of repeating units, and the n and m satisfy the relationship of $45 \leq n \leq 95$ and $5 \leq m \leq 55$).

2. The electrolyte according to claim 1, wherein the polymer compound further contains a vinylidene fluoride polymer having at least a repeating unit derived from vinylidene fluoride.

3. The electrolyte according to claim 2, wherein the vinylidene fluoride polymer is at least one of polyvinylidene fluoride and a vinylidene fluoride-hexafluoropropylene copolymer.

4. The electrolyte according to claim 2, wherein a mass ratio of the copolymer and the vinylidene fluoride polymer is in a range of 20:80 to 50:50.

* * * * *